US012438696B2

(12) United States Patent
Shaul et al.

(10) Patent No.: US 12,438,696 B2
(45) Date of Patent: Oct. 7, 2025

(54) COPY-AND-RECURSE OPERATIONS FOR FULLY HOMOMORPHIC ENCRYPTED DATABASE QUERY PROCESSING

(71) Applicant: International Business Machines Corporation, Armonk, NY (US)

(72) Inventors: Hayim Shaul, Kfar Saba (IL); Guy Moshkowich, Nes Ziyona (IL); Eyal Kushnir, Kfar Vradim (IL)

(73) Assignee: International Business Machines Corporation, New York, NY (US)

( * ) Notice: Subject to any disclaimer, the term of this patent is extended or adjusted under 35 U.S.C. 154(b) by 293 days.

(21) Appl. No.: 18/114,682

(22) Filed: Feb. 27, 2023

(65) Prior Publication Data
US 2024/0297777 A1    Sep. 5, 2024

(51) Int. Cl.
*H04L 9/00*    (2022.01)
*G06F 16/2455*    (2019.01)

(52) U.S. Cl.
CPC ........ *H04L 9/008* (2013.01); *G06F 16/24564* (2019.01)

(58) Field of Classification Search
CPC .............. H04L 9/008; G06F 16/24564
See application file for complete search history.

(56) References Cited

U.S. PATENT DOCUMENTS

| | | | | |
|---|---|---|---|---|
| 8,370,394 B2* | 2/2013 | Atta | ...................... | G06F 16/282 707/797 |
| 8,527,920 B1* | 9/2013 | Choudhury | ........... | G06F 30/327 716/104 |
| 9,418,088 B1* | 8/2016 | Noll | ..................... | H04L 67/1097 |
| 9,646,166 B2 | 5/2017 | Cash | | |
| 9,798,528 B2* | 10/2017 | Gao | ....................... | G06F 8/4441 |
| 11,281,747 B2* | 3/2022 | Kawahara | ............... | G06N 20/00 |
| 2003/0177449 A1* | 9/2003 | Rose | ..................... | G06F 40/117 715/255 |
| 2010/0058265 A1* | 3/2010 | Finkler | ................. | G06F 30/398 716/118 |

(Continued)

OTHER PUBLICATIONS

Agarwal, P.K. et al., "On range searching with semialgebraic sets", Discrete Comput Geom 11, Apr. 1, 1994, 26 pages.

(Continued)

*Primary Examiner* — Meng Li
(74) *Attorney, Agent, or Firm* — CANTOR COLBURN LLP; Anthony Pallone

(57) ABSTRACT

Mechanisms are provided for performing a fully homomorphic encryption operation. The mechanisms generate, for a data set in a backend data store, a tree data structure comprising a hierarchy of nodes and edges connecting the nodes in a parent-child relationship. In response to receiving an encrypted query from a client computing device, a search operation is executed using the tree data structure at least by executing a copy-and-recurse computing tool to identify a portion of the tree data structure to which to apply a fully homomorphic encryption (FHE) operation. The copy-and-recurse computing tool copies a subset of nodes of the tree data structure and recurses the search operation into the copied subset of nodes. The FHE operation is executed on a portion of the data set, corresponding to the identified portion of the tree data structure, to generate results of the FHE operation which are then output.

18 Claims, 9 Drawing Sheets

(56) References Cited

U.S. PATENT DOCUMENTS

| | | | | |
|---|---|---|---|---|
| 2010/0076940 | A1* | 3/2010 | Bordawekar | G06F 16/9027 707/704 |
| 2013/0036473 | A1* | 2/2013 | Myles | G06F 21/14 726/26 |
| 2014/0331044 | A1* | 11/2014 | Fujii | G06F 16/24 713/165 |
| 2015/0067400 | A1* | 3/2015 | Ishii | G06F 11/0706 714/37 |
| 2015/0379032 | A1* | 12/2015 | Kaplan | G06F 16/137 707/747 |
| 2017/0063525 | A1* | 3/2017 | Bacon | H04L 9/008 |
| 2020/0358610 | A1* | 11/2020 | Yeo | G06F 16/9027 |
| 2022/0173886 | A1* | 6/2022 | Sardesai | H04L 63/0428 |
| 2023/0146149 | A1* | 5/2023 | Moon | H04L 9/3073 380/28 |
| 2025/0037186 | A1* | 1/2025 | Wang | G06F 16/9027 |

OTHER PUBLICATIONS

Agarwal, P.K. et al., "On Range Searching with Semialgebraic Sets II", 2012 IEEE 53rd Annual Symposium on Foundations of Computer Science, Oct. 2012, 10 pages.

Aharoni, Ehud et al., "HeLayers: A Tile Tensors Framework for Large Neural Networks on Encrypted Data", arXiv:2011.01805v3 [cs.CR] Jan. 1, 2023, 18 pages.

Akavia, Adi et al., "Privacy-Preserving Decision Trees Training and Prediction", ACM Transactions on Privacy and Security, vol. 25, No. 3, Article 24. Publication date: May 2022, 30 pages.

Akavia, Adi et al., "Secure Data Retrieval on the Cloud: Homomorphic Encryption meets Coresets", IACR Transactions on Cryptographic Hardware and Embedded Systems, 2019(2):Feb. 2019, 26 pages.

Akavia, Adi et al., "Secure Search via Multi-Ring Fully Homomorphic Encryption", Cryptology ePrint Archive, May 2018, 29 pages.

Azogagh, Sofiane et al., "Probonite : Private one-branch-only non-interactive decision tree evaluation.", WAHC'22: Proceedings of the 10th Workshop on Encrypted Computing & Applied Homomorphic Cryptography, Nov. 2022, 11 Pages.

Beaver, Donald et al., "Efficient Multiparty Protocols Using Circuit Randomization", Advances in Cryptology—CRYPTO '91, 11th Annual International Cryptology Conference, Aug. 11-15, 1991, 13 pages.

Beimel, Amos et al., "Reducing the Servers Computation in Private Information Retrieval: PIR with Preprocessing", Advances in Cryptology—CRYPTO 2000 20th Annual International Cryptology Conference, Aug. 20-24, 2000, 19 pages.

Brakerski, Zvika et al., "Fully Homomorphic Encryption without Bootstrapping", ITCS '12: Innovations in Theoretical Computer Science, Jan. 8-10, 2012, 27 pages.

Cheon, Jung Hee et al., "Efficient Homomorphic Comparison Methods with Optimal Complexity", Advances in Cryptology—ASIACRYPT 2000, 6th International Conference on the Theory and Application of Cryptology and Information Security, Dec. 3-7, 2000, 32 pages.

Cheon, Jung Hee et al., "Homomorphic Encryption for Arithmetic of Approximate Numbers", Asiacrypt 2017, the 23rd Annual International Conference on the Theory and Application of Cryptology and Information Security, Dec. 2017, 23 pages.

Cheon, Jung Hee et al., "Search-and-compute on Encrypted Data", Financial Cryptography and Data Security (FC15) 19th International Conference, Jan. 26-30, 2015, 27 pages.

Cong, Kelong et al., "SortingHat: Efficient Private Decision Tree Evaluation via Homomorphic Encryption and Transciphering", CCS '22: Proceedings of the 2022 ACM SIGSAC Conference on Computer and Communications Security Nov. 2022, 27 pages.

Corrigan-Gibbs, Henry et al., "Private information retrieval with sublinear online time", 39th Annual International Conference on the Theory and Applications of Cryptographic Techniques, May 10-14, 2020, Proceedings, Part I, 69 pages.

De Berg, Mark et al., "Computational Geometry: Algorithms and Applications", Springer-Verlag TELOS, Santa Clara, CA, USA, 2nd ed. edition, Jun. 2000, 367 pages.

Demertzis, Ioannis et al., "Practical Private Range Search In Depth", ACM Transactions on Database Systems, vol. 9, No. 4, Article 39. Publication date: Mar. 2018, 50 pages.

Demertzis, Ioannis et al., "Practical Private Range Search Revisited", SIGMOD/PODS'16: International Conference on Management of Data, Jun. 2016, 14 pages.

Drucker, Nir et al., "Bleach: Cleaning Errors in Discrete Computations over CKKS", Cryptology ePrint Archive, Paper, 2022/1298, Apr. 2022. https://eprint.iacr.org/2022/1298, 39 pages.

Ducas, Leo et al., "Sanitization of FHE Ciphertexts", Advances in Cryptology—Eurocrypt 2016 35th Annual International Conference on the Theory and Applications of Cryptographic Techniques, May 8-12, 2016, 19 pages.

Falzon, Francesca et al., "Range Search over Encrypted Multi-Attribute Data", Proceedings of the VLDB Endowment vol. 16 Issue 4, 16 pages.

Geary, Richard F. et al., "A simple optimal representation for balanced parentheses", Theoretical Computer Science vol. 368, Issue 3, Dec. 10, 2006, 16 pages.

Halevi, Shai et al., "Algorithms in HElib", Advances in Cryptology—CRYPTO 2014,34th Annual Cryptology Conference, Aug. 17-21, 2014, Proceedings, Part I, 20 pages.

Hasan, Mohammad Z. et al., "Secure count query on encrypted genomic data", Journal of Biomedical Informatics vol. 81, May 2018, pp. 41-52.

Iliashenko, Ilia et al., "Homomorphically counting elements with the same property", The 22nd Privacy Enhancing Technologies Symposium Jul. 11-15, 2022, 20 pages.

Kim, Myungsun et al., "Private Compound Wildcard Queries Using Fully Homomorphic Encryption", IEEE Transactions on Dependable and Secure Computing, vol. 16, No. 5, pp., Sep. 1-Oct. 2019, 14 pages.

Lee, Eunsang et al., "Minimax Approximation of Sign Function by Composite Polynomial for Homomorphic Comparison", IEEE Transactions on Dependable and Secure Computing, vol. 19, No. 6, Nov.-Dec. 2022, 22 pages.

Matousek, Jiri, "Efficient partition trees", In Proceedings of the seventh annual symposium on Computational geometry (SCG '91). Association for Computing Machinery, 9 pages.

Saha, Tushar K. et al., "Efficient Private Conjunctive Query Protocol Over Encrypted Data", Cryptography 5, No. 1: 2, Jan. 18, 2021, 22 pages.

Tueno, Anselme et al., "Non-Interactive Private Decision Tree Evaluation", arXiv:1909.08362v1 [cs.CR] Sep. 18, 2019, 16 pages.

Tueno, Anselme et al., "Private Evaluation of Decision Trees using Sublinear Cost", PETS 2019 The 19th Privacy Enhancing Technologies Symposium Jul. 16-20, 2019, 21 pages.

Vo-Huu, Triet D. et al., "EPiC: efficient privacy-preserving counting for MapReduce", Computing vol. 101, Jun. 18, 2018, 22 pages.

* cited by examiner

Protocol 1: *RangeSearchingProtocol*

Parties: Key owner, Data owner, Range owner, Cloud.
Parameters: $d > 0$ the dimension of the space;
$\Gamma \subset 2^{\mathbb{R}^d}$ a family of ranges.
Key Owner Input: A pair $(sk, pk)$ of secret and public keys.
Data Owner Input: A set $P \subset \mathbb{R}^d$ of $n$ points.
Range Owner Input: Ranges $y_1, y_2, \ldots \in \Gamma$.
The Cloud has no input.
Key Owner Output: $f(P \cap y)$.
Other parties have no output.

1 Key-owner Performs:
2   Send $pk$ to Cloud, Data-owner, Range-owner.
3 Data-owner Performs:
4   Choose a parameter $0 < r < n$.
5   $(T', \xi, h) :=$ Build a partition tree for $P$ and $\Gamma$ with parameter $r$.
6   $T := FillTree(n, r, h, T')$. // Call *FillTree* (Algorithm 2)
7   $T :=$ encrypt $o.f, o.\sigma$ for every $o \in T$.
8   Send $T, n, \Gamma, \xi, r, t, h$ to Cloud.
9 foreach range $y$ *the Range-owner has* do
10    Range-owner performs:
11       $[\![y]\!] := Enc_{pk}(y)$
12       Send $[\![y]\!]$ to Cloud.
13    Cloud performs:
14       /* Call *PPRangeSearch* (Algorithm 3) */
15       $[\![x]\!] := PPRangeSearch_{n,d,\Gamma,\xi,r,h}(T, [\![y]\!])$
16       Send $[\![x]\!]$ to Key-owner.
17    Key-owner performs:
18       $x := Dec_{sk}([\![x]\!])$
19    Output $x$

*FIG. 3*

Algorithm 2: $FillTree_{n,r,h}(T')$

Parameters: Number of points $n = |S_{real}|$; the parameters $0 < r < n$ and $h$ as specified in the partition theorem.
Input: A tree $T'$
Output: A full tree $T'$ where all inner nodes have $r$ children and all leaves have distance $\log_{r/h} n$ from the root.

1 while *There are nodes with less than $r$ children or leaves whose distance from the root is less than $\log_{r/h}$* do
2      Add an empty child node to an inner node that has less than $r$ children.
3      Add $r$ empty children nodes to leaves whose distance from the root is less than $\log_{r/h} n$.

*FIG. 5*

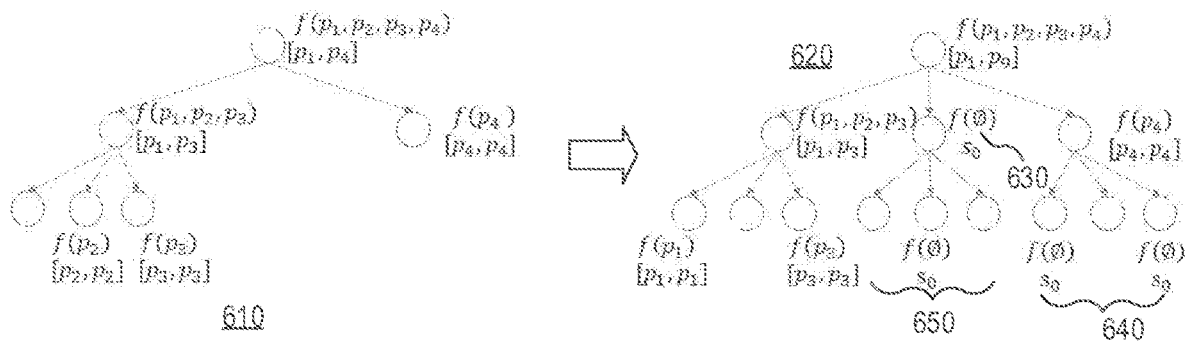

*FIG. 6*

Algorithm 3: $PPRangeSearch_{n,d,\Gamma,f,g,\xi,r,h}(T, [\![y]\!])$

Parameters: $n$ the number of points in $P$; $d > 0$ the dimension of the space; $\Gamma \subset 2^{\mathbb{R}^d}$ a family of ranges; $\xi, h > 0$, parameter derived from the partition theory used when building the partition tree. $\xi$ is a bound on the number of sets in a partition that cross $y \in \Gamma$ and the size of each set is $n/r \leq n_i \leq hn/r$.

Input: A (sub)tree $T$ where $v$ is its root;
an encrypted range $[\![y]\!]$, where $y \in \Gamma$.

Output: $[\![x]\!]$, where $x = f(v.P \cap y)$.

1  if $v$ is a *leaf* then
2    // check whether $v.\sigma \subseteq y$
     $[\![Cont]\!] := IsContaining([\![v.\sigma]\!], [\![y]\!])$
3    Output $[\![Cont]\!] \cdot [\![v.f]\!] + (1 - [\![Cont]\!])f(\emptyset)$
4  else
5    $[\![x]\!] := [\![f(\emptyset)]\!]$
6    foreach $i = 1, \ldots, r$ do
       // check whether $v.child[i].\sigma \subseteq y$
7      $[\![Cont[i]]\!] := IsContaining([\![v.child[i].\sigma]\!], [\![y]\!])$
8      $[\![x]\!] := (1 - [\![Cont[i]]\!]) \cdot [\![x]\!] + [\![Cont[i]]\!] \cdot$
       $g([\![x]\!], [\![v.child[i].f]\!])$
9    foreach $i = 1, \ldots, r$ do
       // check whether $v.child[i].\sigma$ crosses $y$
10     $[\![Cross[i]]\!] := IsCrossing([\![v.child[i].\sigma]\!], [\![y]\!])$
     // Blindly copy $\xi$ sub-trees using Algorithm 4
11   $[\![M]\!] := BuildCopyAndRecurseMatrix_{r,\xi}([\![Cross]\!])$
12   $[\![child']\!] = M \cdot [\![v.child]\!]$
13   $[\![Cross']\!] = M \cdot [\![Cross]\!]$
14   foreach $i = 1, \ldots, \xi$ do
15     $[\![x]\!] := (1 - [\![Cross'[i]]\!]) \cdot [\![x]\!] +$
16     $[\![Cross'[i]]\!] \cdot$
       $g([\![x]\!], PPRangeSearch_{n,d,\Gamma,f,g,\xi,r,h}(child'[i], [\![y]\!]))$
17   Output $[\![x]\!]$

FIG. 7

Algorithm 4: *BuildCopyAndRecurseMatrix$_{r,\xi}$([c])*

Input: A vector $[c]$, where $c \in \{0,1\}^r$.
Parameters: $\xi < r$, s.t. $\sum c_i \leq \xi$.
Output: A matrix $[M]$ where $M \in \{0,1\}^{\xi \times r}$ s.t. for any $x \in \mathbb{R}^r$ $$(M \cdot x)[j] = \begin{cases} x[i] & \text{if } c[i] \text{ is the } j\text{-th value of } 1, \\ 0 & \text{if } c[i] \text{ has less than } j \text{ non-zero elements.} \end{cases}$$

1 for ( $row = 1, \ldots, r$ )
2 $\quad M[1, row] = c[row] \cdot \prod_{i=1}^{row-1}(1 - c[i])$
3 for ( $col = 2, \ldots, \xi$ )
4 $\quad$ for ( $row = 1, \ldots, r$ )
5 $\quad\quad M[col, row] =$
$\quad\quad\quad c[row] \sum_{k=1}^{row-1}\left(M[col-1, k] \prod_{h=k+1}^{row-1}(1 - c[h])\right)$
6 Output: $[M]$

*FIG. 8*

COPY-AND-RECURSE OPERATIONS FOR FULLY HOMOMORPHIC ENCRYPTED DATABASE QUERY PROCESSING

BACKGROUND

The present application relates generally to an improved data processing apparatus and method and more specifically to an improved computing tool and improved computing tool operations/functionality for providing a copy-and-recurse operation to perform fully homomorphic encrypted database query processing.

Fully homomorphic encryption (FHE) is an encryption scheme that enables analytical functions to be run directly on encrypted data while yielding results from the encrypted data that are the same as if the analytical functions were executed on the unencrypted data, also referred to as the plaintext. Such encryption schemes are attractive in cloud-based computing environments as it allows data providers to encrypt their data, and thereby maintain the privacy or secrecy of the data, before providing the encrypted data to cloud services that execute analytical functions on the encrypted data, train machine learning computer models using the encrypted data as training and testing datasets, execute machine learning computer models on the encrypted data, or the like, and generate results that are returned to the data providers. This allows data providers to leverage the computational capabilities and services of cloud-based computing environments without exposing their private data to other parties. FHE is likewise attractive to database providers who can encrypt their data in the database, yet still respond to queries without exposing the sensitive data, such as respond to queries for statistical information.

For example, a data provider, e.g., a hospital, medical insurance company, financial institution, government agency, or the like, may maintain a database of data comprising private data about patients that the data provider does not want exposed outside of its own computing environment. However, the data provider, for various reasons, wishes to utilize the analytical capabilities, machine learning computer models, or the like, of one or more cloud-based computing systems to perform analytical functions, artificial intelligence operations, such as generating insights from classifications/predictions performed by trained machine learning computer models, or the like, on the private data. For example, if the data provider is a hospital and wishes to perform analytics on its patient data, the hospital would like to send the patient data to the cloud-based computing systems for performance of these analytics, which may use specially trained machine learning algorithms and the like. However, the hospital does not want to expose the personally identifiable information (PII) of the patients, e.g., names, addresses, social security numbers, or other types of information that alone or in combination can uniquely identify an individual, as such exposure would not only open the hospital to legal liability, but may also be in violation of established laws of the jurisdiction(s) in which the hospital operates. As a result, using FHE, the hospital may encrypt the data prior to sending the encrypted data to the cloud-based computing system for performance of the analytics functions. The analytics are executed on the encrypted data and the encrypted results are returned. The data provider then unencrypts the encrypted results and obtains the unencrypted results for use by the hospital. At no time in this process does the cloud-based computing system gain access to the unencrypted data and thus, privacy is preserved.

Similarly, the data provider, e.g., the hospital, may wish to allow others to query their encrypted database to gather statistical information without exposing the underlying private or sensitive data. Thus, the hospital may use FHE to perform operations on the encrypted data of the database and generate results without the operations accessing the private or sensitive data in plaintext (unencrypted).

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for performing a fully homomorphic encryption operation. The method comprises generating, for a data set in a backend data store, a tree data structure comprising a hierarchy of nodes and edges connecting the nodes in a parent-child relationship. The method further comprises, in response to receiving an encrypted query from a client computing device, executing a search operation using the tree data structure at least by executing a copy-and-recurse computing tool to identify a portion of the tree data structure to which to apply a fully homomorphic encryption (FHE) operation. The copy-and-recurse computing tool copies a subset of nodes of the tree data structure and recurses the search operation into the copied subset of nodes. In addition, the method comprises executing the FHE operation on a portion of the data set, corresponding to the identified portion of the tree data structure, to generate results of the FHE operation. Moreover, the method comprises outputting the results as an encrypted output to the client computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example protocol for performing a range searching operation in accordance with one illustrative embodiment;

FIG. 5 is an example diagram illustrating an example algorithm for converting a partition tree to a full tree by adding empty nodes in accordance with one illustrative embodiment;

FIG. 6 is an example of a partition tree and its full partition tree version after empty nodes have been added to it in accordance with one illustrative embodiment;

FIG. 7 is a diagram that shows an example algorithm for performing privacy preserving range queries in accordance with one or more illustrative embodiments;

FIG. 8 is an example diagram of a Compact function in accordance with one illustrative embodiment;

DETAILED DESCRIPTION

Figure 1:
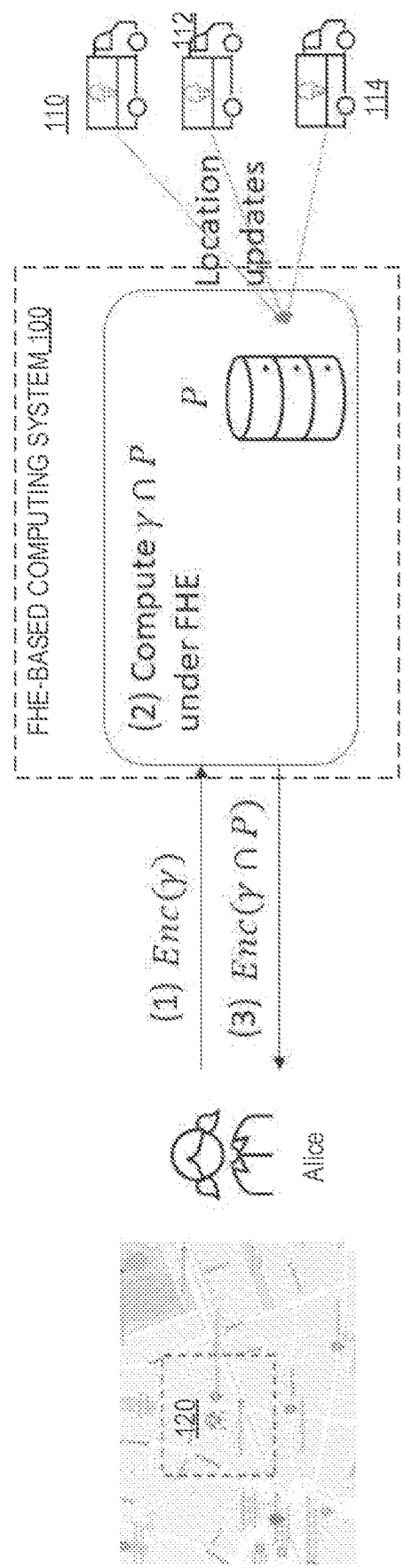
FIG. 1 is an example diagram illustrating a fully homomorphic encryption (FHE) based operation for querying a database of location information for vehicles.

Many problems in computing systems, database systems, and the like, can be reduced to a range searching operation where a finite set of points $P \subset \mathbb{R}^d$ and a volume (or range) $\gamma \subset \mathbb{R}^d$ are given, and one wishes to find $P \cap \gamma$ quickly. That is, with a database with d features, each record is considered a point $(r_1, \ldots, r_d) \in \mathbb{R}^d$. A range in this d-dimensional space is defined as a volume where a point matches a query if, and only if, the record is in the volume. In such cases, at least for some database queries, these database queries can be stated as a range (volume) query problem. For example, the query $(\alpha_1 \leq r_1 \leq b_1) \wedge \ldots \wedge (\alpha_d \leq r_d \leq b_d)$ can be stated as an axis-parallel hyperbox range.

As a simple example, consider a location computing service provided by one or more computing devices, where $P \subset \mathbb{R}^2$ can be the locations of vehicles, e.g., ice cream trucks, ride share vehicles, etc., and $\gamma$ can be a small area centered at a person's location. Thus, $P \cap \gamma$ is the set of vehicles in a walkable distance. In some cases, it is important to keep $\gamma$ private. For example, if the person is a child, then that child's parent may wish to keep the child's location private, or the person themselves may want to keep their own location private from other entities. In addition, the party operating the vehicle, e.g., the ice cream truck company, may wish to avoid knowing its client's location fearing liability if the company's servers are breached. Thus, it is beneficial to have the data and queries encrypted to protect the privacy of the parties involved. Moreover, since the locations of the vehicles change continuously, their locations cannot be downloaded offline, and downloading the entire location database is inefficient, especially if it is expected that the service is accessed over a large number of mobile computing devices, as is commonplace in modern wireless distributed computing systems. In addition, downloading the entire location database also introduces similar privacy concerns as there are multiple copies of the database in such instances and access to the location data is less restricted once downloaded.

Fully Homomorphic Encryption (FHE) allows analytical functions to be performed on private data without divulging the private data itself, without the need for trusted third parties or intermediaries, and without having to mask or drop features in order to preserve privacy of the data, e.g., through replacement of personally identifiable information (PII) with generic privacy preserving representations of the PII, or other modifications or replacements of private data. When keeping private data in a database in the cloud, the data in the database, and the queries on the database, are encrypted to protect the privacy of the data. This encryption may be accomplished using FHE mechanisms. With such systems, the private data is not exposed outside the database, but queries directed to particular types of evaluations may be applied against the encrypted database to obtain useful information without exposing the private data. For example, a query may want to identify a particular number of entries in the database that match criteria specified in the query. The query is encrypted, as is the private data, but the FHE mechanism is able to generate the query results, e.g., the count of the number of matching entries in the database, and return the count without exposing the encrypted contents of the query or the encrypted private data in the database.

FIG. 1 is an example diagram illustrating a FHE based operation for querying a database of location information for vehicles. With the example in FIG. 1, a FHE-based computing system 100 provides a privacy preserving range searching operation that a user, Alice, uses to identify locations of vehicles 110-114, e.g., the ice cream trucks in the previously mentioned example. Upon registering with the privacy preserving range searching computing service hosted by the FHE-based computing system 100, Alice shares with the computing system 100 her public key. To perform a query, Alice creates a range, $\gamma$, (which is a small area where she is at the center of this range, shown in dashed line on the map 120). At (1), she encrypts $\gamma$ and sends the encrypted query Enc($\gamma$) to the computing system 100. At (2), the FHE-based computing system 100, hosting the privacy preserving range searching computing service, processes the range searching query on a set of points P and the encryption of $\gamma$ using FHE. The results of processing the encrypted query is the encryption of $P \cap \gamma$ which is sent back to Alice at (3). Alice decrypts the encrypted results and is able to determine $P \cap \gamma$.

With existing FHE mechanisms, when responding to an encrypted database query, it is necessary that the FHE mechanism go over every record in the database array to determine which records match the criteria of a query as there is no ability to determine which subsets of records may be excluded from the evaluation due to the encrypted nature of the data and the query. That is, every record in the database array is evaluated and, for a counting query as an example, the record is counted if it meets the criteria of the query. This is referred to as the "naïve" approach or implementation as it effectively checks for every point $p \in P$ whether it is contained in $\gamma$ for a total of $O(n \cdot t)$ operations, where $n = |P|$ and t is the time to check whether $p \in \gamma$. It is readily apparent that this naïve approach quickly becomes impractical even for medium size databases.

In plaintext, some solutions avoid checking each point or record in a database, by utilizing functions to group points together, checking whether the entire group is contained in the range (or volume) γ, and recursively continuing only in groups that are partially contained in the specified range γ. These solutions rely heavily on branching in the code. This is something that is impossible under FHE and secure range searching problems. When running under FHE, an algorithm is unable to compare values or compute only one branch of code according to the comparison. Instead, each condition is replaced with a polynomial c(·) whose variables are the input to the comparison and whose value is 1 or 0 depending on the compared values. Branching is then replaced by computing both branches, multiplying one branch by the polynomial c, and the other branch by (1−c). This effectively computes both branches of code. This is why when prior works traverse a tree under FHE, they effectively visit all nodes in the tree. Thus, solutions that work well in plaintext do not extend well to FHE.

The illustrative embodiments provide an improved computing tool and improved computing tool functionality/operations that address tree traversal under FHE and more specifically, in some illustrative embodiments, traversing a partition tree to solve the secure range searching problem under FHE. For the secure range searching problem, a solution is provided that uses $$O\left(n + t * n^{1-\frac{1}{d}+\epsilon}\right)$$

operations, where t is the operations needed to compare a range to a simplex and ϵ>0 is a parameter chosen when implementing the solution. Choosing a small value for ϵ reduces the value of $$n^{1-\frac{1}{d}+\epsilon},$$

but there is a multiplicative factor that depends on ϵ that increases when ϵ decreases. The value of ϵ can be arbitrarily small, depending on the desired implementation, but the value of epsilon should be selected taking into consideration the multiplicative factor as well.

Since in practice comparing the range to various objects is what dominates the running time in many cases the improved computing tool and improved computing tool functionality outperforms the naive solution, i.e., checking each record, which takes O(n*t) to compute. It is noted that under FHE the problem has a lower bound of Ω(n) since there exists a reduction from the private information retrieval (PIR) problem to the range searching problem. It should also be noted that the best known plaintext solution, with storage of size linear in n, takes $$O\left(t * n^{1-\frac{1}{d}+\epsilon}\right)$$

time using a data structure referred to as "partition trees" and thus, the secure range searching problem solution of the illustrative embodiments is within O(n) time of the plaintext solution.

With the illustrative embodiments, the improved time bounds achieved by the partition tree using the copy-and-recurse computing tool described herein, may be at least partially attributed to the illustrative embodiments' use of partition trees to solve range searching together with the improved copy-and-recurse functionality that is specific to the present invention. That is, in accordance with some illustrative embodiments, the mechanisms of the illustrative embodiments generate a partition tree for a set of data and then perform a copy-and-recurse based secure range searching operation on the partition tree to find the groups of data points or records of a database that match criteria of a secure query using range searching mechanisms. While the illustrative embodiments will make reference to partition tree data structures for a set of data, where nodes represent a subset of the set of data and edges connect the nodes in a parent-child relationship, the illustrative embodiments are not limited to such and may be applied to other tree data structures where a property of the tree data structure is that at most x children need to be recursed into, where x is a predetermined value. For example, the tree data structure may be a decision tree data structure where each node is associated with a condition that needs to be checked and each leaf node is associated with a label. Other tree data structures may likewise be a basis for the mechanisms of the improved computing tool and improved computing tool functionality of the illustrative embodiments without departing from the spirit and scope of the present invention.

Assuming a partition tree data structure embodiment, the copy-and-recurse computing tool allows the range searching process to traverse partition trees efficiently under FHE. Specifically, when traversing a r-ary partition tree (i.e., each inner node has r children) that has a bound ξ<r on the number of children the process needs to recurse into, the copy-and-recurse computing tool and functionality copies ξ children and their subtrees (under FHE) and recurses only into the copied children. The choice of r and the bound ξ determine the value of ϵ. This copy-and-recurse computing tool, executed on partition trees, solves the range searching problem, such as those used in FHE based mechanisms, e.g., encrypted databases and encrypted queries. However, the mechanisms of the illustrative embodiments are applicable to other tree based solutions as well without departing from the spirit and scope of the present invention as noted above.

In some illustrative embodiments, the copy-and-recurse functionality efficiently traverses a full r-ary tree (i.e., each inner node has r children) with n leaves, where there is a bound ξ on the number of children that need to be recursed into at each node. Here r is a parameter 0<r<n and the traversing complexity depends on r and ξ. As an overview, the copy-and-recurse functionality traverses a partition tree by, when visiting a node, determining (under FHE) which children need to be recursed into, copying ξ children and their subtrees to a buffer, and then continuing recursion into the copies of ξ children. Range searching queries can be answered using the partition trees which comply with the requirements of the r-ary tree where at most $$O\left(r^{1-\frac{1}{d}}\right)$$

children need to be recursed into, where r is the number of children, d is the dimension of the space the problem is defined in.

The range searching based operations, e.g., counting a number of matching records in a database, reporting matching records in a database, and the like, may be generalized as operations that output $f(P \cap \gamma)$ for a large set of functions. Specifically, any function $f$, where there exists another function g such that $f(A \cup B) = g(f(A) f(B))$, where A, B ⊂ P and A∩B=∅. This means that the mechanisms of the illustrative embodiments can be applied to compute any function f( ) that can be applied in a divide-and-conquer way, i.e., by splitting the set (A∪B) it is applied on to 2 sets A and B, compute f(A) and f(B) and then join the outputs to get f(A∪B). The illustrative embodiments are able to perform such range searching based operations when processing queries while preserving privacy, such as via FHE mechanisms. In some illustrative embodiments, the improved computing tool functionality may be implemented with a homomorphic encryption HElayers library, available from IBM Corporation of Armonk, New York, to write packing-oblivious code and the Homomorphic Encryption for Arithmetic of Approximate Numbers (HEAAN) software library as the FHE scheme, although other HE and FHE libraries and mechanisms may be used without departing from the spirit and scope of the present invention.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As discussed above, the illustrative embodiments provide an improved computing tool and improved computing tool functionality/operations for performing privacy preserve range searches. That is, the illustrative embodiments provide an improved computing tool and improved computing tool operations/functionality for providing a copy-and-recurse operation on partition tree data structures to perform fully homomorphic encrypted query processing that provides improved performance over computer solutions that require evaluating each individual data point, or record in a database, to process encrypted queries of encrypted data.

Figure 2:
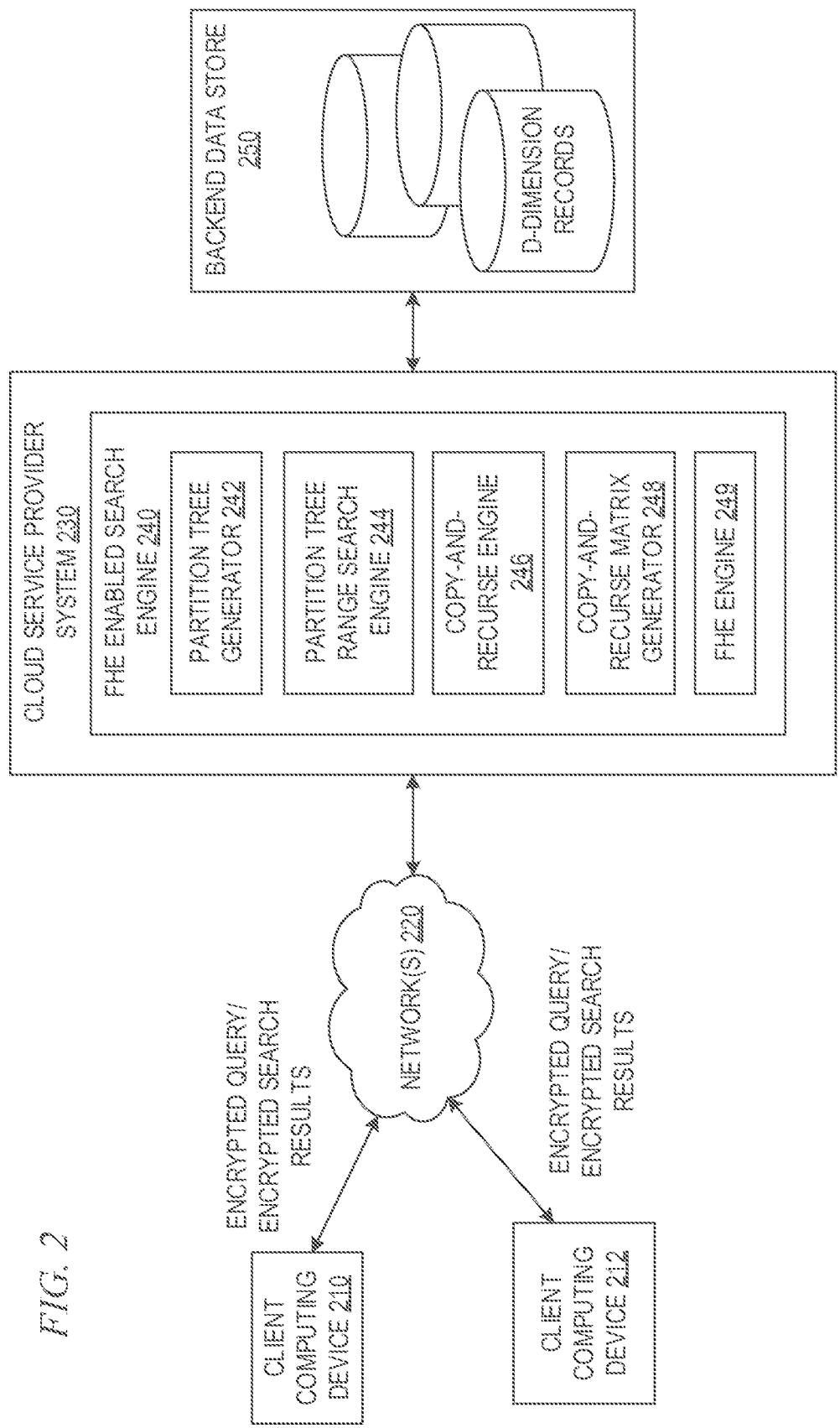
FIG. 2 is an example block diagram illustrating the primary operational components of a Fully Homomorphic Encryption (FHE) enabled search engine in accordance with one illustrative embodiment.

FIG. 2 is an example block diagram illustrating the primary operational components of a Fully Homomorphic Encryption (FHE) enabled search engine in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving the way that FHE searches are performed, and providing a specific solution that implements partition trees and a copy-and-recurse operation that cannot be practically performed by human beings as a mental process and is not directed to organizing any human activity.

As shown in FIG. 2, similar to FIG. 1, client computing devices 210-212, using Fully Homomorphic Encryption (FHE) based computer system configurations, submit encrypted queries, via one or more wired/wireless data networks 220, to a cloud service provider system 230 which may include a FHE enabled search engine 240 and backend data stores 250, which may be a single or distributed database, for example. It should be appreciated that while the cloud service provider system 230 is shown as a single component in FIG. 2, in actual implementation, the mechanisms of the cloud service provider system 230 may be distributed across multiple computing systems (e.g., server computing devices), at various locations but which virtually provide a single point of service from the perspective of the clients 210-212. In distributing the mechanisms of the cloud computing service 230 across multiple computing systems, it should be appreciated that the components of the cloud computing service 230 may be provided on different computing systems or different computing devices, and in some cases may be replicated on different computing systems or different computing devices of the cloud computing service 230. Moreover, different computing systems or computing devices in the cloud computing service 230 may be responsible for different sets of data stored in the backend data stores 250 and may have separate instances of component 240 for each of these different sets of data. Although not shown in FIG. 2, appropriate routing logic may be implemented in the cloud service 230 to directed queries to appropriate ones of the computing systems that make up the cloud service 230.

The cloud service 230 may provide any suitable computing service to the client computing devices 210, 212, which may be wired or wireless client computing devices 210, 212, e.g., desktop computers, mobile computerized communication devices, tablet computers, vehicle mounted computing devices, or the like. For example, the cloud service 230 may provide a location service (see example discussed with regard to FIG. 1) that may be used by users of the client computing devices 210, 212 or applications executing on the client computing devices 210, 212. Other types of cloud services 230 with protected backend data stores 250, e.g., encrypted databases, may also be implemented with the mechanisms of one or more of the illustrative embodiments. For example, the protected backend data stores 250 may comprise an encrypted database of medical data for a plurality of patients, and the cloud services 230 may provide functionality for generating reports of statistics based on the encrypted data. Thus, queries may be submitted to determine various statistical measures, e.g., how many people, under certain conditions, e.g., blood pressure range, cholesterol level within a given range, etc., are represented in the database.

The cloud service 230 is one that utilizes FHE to protect the private data of the backend data store 250 provider as well as the privacy of the queries submitted by the client computing devices 210, 212. The cloud service provider system 230 implements a FHE enabled search engine 240 to process encrypted search queries from client computing devices 210, 212 and provide encrypted results which may then be decrypted at the client computing devices 210, 212 without exposing the backend data stored in the backend data stores 250.

The FHE enabled search engine 240 is improved by the mechanisms of the illustrative embodiments to provide a partition tree based range search capability that improves the way in which FHE queries are processed, as will be described in greater detail hereafter, with regard to specifics of the various algorithms implemented in the depicted components. The FHE enabled search engine 240 includes a partition tree generator 242 which provides logic for generating one or more partition trees corresponding to the data, or portions of the data, stored in the backend data stores 250 (see discussion hereafter with regard to FIG. 4). The partition tree generator 242 may operate to fill the partition tree with empty child nodes where necessary to generate a full tree that is more conducive to FHE operations (see algorithm and examples in FIG. 5-6). The FHE enabled search engine 240 further includes a partition tree range search engine 244 that implements the logic described hereafter for performing partition tree range searches under HE (see discussion hereafter with regard to FIG. 7). The copy-and-recurse matrix generator 248 provides logic for generating a matrix that enables the partition tree range search engine 244 (see algorithm and discussion of FIG. 8) to copy ξ children to a buffer, where the children that need to be recursed into are among them.

The partition tree range search engine 244 may invoke operations of the copy-and-recurse engine 246 to perform copying-and-recurse on child nodes of the partition tree, as described hereafter, to facilitate range searching under FHE. While not shown in FIG. 2, the copy-and-recurse engine 246 may include one or more buffers into which the child nodes and their sub-trees are copied in order to perform the recurse operation for searching the partition tree. The partition tree range search engine 244, copy-and-recurse engine 246, and copy-and-recurse matrix generator 248 operations, along with the partition trees, as generated by the partition tree generator 242, and upon which the copy-and recurse operations of elements 244-248 operate, provide a distinct improvement in the performance of range searches under FHE, as discussed hereafter.

The FHE enabled search engine 240 operates on an encrypted search query and one or more partition tree data structures representing the backend data, to perform range searches for operations corresponding to the received encrypted search query. The actual FHE operations themselves may be performed by the FHE engine 249, with the other components operating to govern which portions of data in the backend data store 250 need to be evaluated with FHE operations, in a manner that is more efficient than checking every data point or record in the backend data stores 250. That is, the FHE enabled search engine 240 may receive an encrypted query from a client computing device 210 which requests an operation that can be represented as a range search operation in FHE, e.g., a counting operation, a reporting operation, an averaging operation, a k-means clustering operation or the like. The FHE enabled search engine 240 performs range searches on partition trees using a copy-and-recurse functionality as described herein, to identify child nodes and sub-trees that should be recursed into such that FHE operations by the FHE engine 249 need only be performed on selected sub-portions of the data in the backend data stores, rather than all data points or all records in the database. Once the results of the FHE operations on the selected sub-portion are completed, a response to the original encrypted query is generated and the cloud service provider system 230 may return encrypted results to the client computing devices 210, 212.

Before discussing in detail the partition tree and copy-and-recurse operation based mechanisms of the illustrative embodiments, it is first beneficial to discuss fully homomorphic encryption operations, notations, and computational geometry terminology that are used in this description. Fully homomorphic encryption (FHE) is an asymmetric encryption scheme that supports addition and multiplication operations on ciphertexts. More specifically, a FHE scheme is the tuple E=(Gen, Enc, Dec, Add Mult), where:

Gen($1^\lambda$,p) gets a security parameter $\lambda$ and an integer p and generates the keys pk and sk.

$Enc_{pk}$(m) gets a message m and outputs a ciphertext [[m]].

$Dec_{sk}$([[m]]) gets a ciphertext [[m]] and outputs a message m.

$Add_{pk}$([[a]],[[b]]) gets two ciphertexts [[a]], [[b]] and outputs a ciphertext [[c]].

$Mult_{pk}$([[a]], [[b]]) gets two ciphertexts [[a]] and [[b]] and outputs a ciphertext [[d]].

Correctness in FHE is the requirement that m=m', i.e., the decrypted message is the same as the original message m, c=a+b mod p and d=a·b mod p, i.e. that one can apply add/multiply on two ciphertexts and get the sum/product of their messages. In an approximated FHE approach, it is required that m≈m', c≈a+b mod p and d≈a·b mod p. The notation [[·]]g is used to denote a ciphertext, but when pk (public key) is clear from the context it may be omitted. The following abbreviated syntax will be used in this description:

[[a]]+[[b]] is short for $Add_{pk}$([[a]], [[b]]).
[[a]]*[[b]] is short for $Mult_{pk}$([[a]], [[b]]).
[[a]]+b is short for $Add_{pk}$([[a]], $Enc_{pk}$(b)).
[[a]]*b is short for $Mult_{pk}$([[a]], $Enc_{pk}$(b)).

Using these operations one can construct any arithmetic circuit (model for computing polynomials) and compute any polynomial $\mathbb{P}$($x_1$, . . . ) on the ciphertexts $x_1$, $x_2$, . . . etc. For example, in a client-server computing system, the client may encrypt their data and send it to the server to compute a polynomial $\mathbb{P}$ on the en input. The output is also encrypted and is returned to the client, as mentioned above with regard to FIGS. 1 and 2. The client then decrypts the output. The semantic security of FHE guarantees the server does not learn anything of the content of the client's data. Since multiplication operations are significantly slower than addition, the cost of evaluating an arithmetic circuit, C, with FHE is considered and determined to be Time=overhead·size(C), where overhead is the time to evaluate one multi-gate, and varies with the underlying implementation of the FHE scheme. For example, for the Brakerski-Gentry-Vaikuntanathan (BGV) FHE scheme, an overhead=overhead(C)=O(depth(C))$^3$.

With regard to computational geometry terminology and concepts used herein, it is important to understand the concepts of range space, range searching, algebraic range, semi-algebraic range, constant description complexity, elementary cell partition (or simplicial partition), crossing number, and the partition theorem. These are described hereafter as follows.

Range space: A range space is a pair (X,Γ), where X is a set (of anything, e.g., in FIG. 1 this is the set of all points in the plain, in FIG. 2 this may be the set of all data records) and $\Gamma \subset 2^X$ is a family of subsets, called ranges. In some illustrative embodiments, the solution provided by the copy-and-recurse operation, described hereafter, considers X=$\mathbb{R}^d$ for some d, where again d is the dimensional space of the data points, e.g., database records in the backend data stores 250 in FIG. 2.

Range Searching: The range searching problem studied in computational geometry is as follows: given a set of n points $P \subset \mathbb{R}^d$ and a family of ranges Γ, preprocess P into a data structure $\mathbb{D}$, such that given a range γ∈Γ, and using $\mathbb{D}$, |P∩γ| can be efficiently computed. In the example of FIG. 1, Γ is the set of all axis-parallel-rectangles, e.g., the dashed rectangle in FIG. 1.

Algebraic range: A d-dimensional algebraic range is a subset $\gamma \subset \mathbb{R}^d$ defined by an algebraic surface given by a function that divides $\mathbb{R}^d$ into two regions (e.g., above and below). This function is also denoted as γ.

Semi-algebraic range: A d-dimensional semi-algebraic range is a subset $\gamma \subset R^d$ that is a conjunction and disjunction of a bounded number of algebraic ranges. Simply put, a semi-algebraic range is the result of intersections and unions of algebraic ranges.

Constant description complexity: The description complexity of a range is the number of parameters needed to describe it. For example, the half-space range bounded by a plane in $\mathbb{R}^3$ ax+by+cz+1=0 has 3 parameters, a, b, and c. The description complexity can be large. For example, a star-shaped volume in $\mathbb{R}^3$ with n "spikes" has a description complexity of O(n). In some illustrative embodiments, the mechanisms of the illustrative embodiments operate based on ranges that have constant description complexity.

Elementary Cell Partition (or Simplicial Partition): Given a set $P \subset \mathbb{R}^d$ of n points, an elementary cell partition (or simplicial partition) is a collection $\Pi=\{(P_1,\sigma_1), \ldots, (P_m, \sigma_m)\}$ where $P_i$'s are disjoint subsets such that $\cup P_i = P$ and each $P_i \subset \sigma_i$, where $\sigma_i$ is a simplex. The size of the partition is m.

Crossing number: Given a simplicial partition $\Pi=\{(P_1,\sigma_1), \ldots, (P_m,\sigma_m)\}$ and a range $\gamma$, the crossing number of $\gamma$ with respect to $\Pi$ is the number of simplices $\gamma$ crosses, i.e., $|\{\sigma_i | \sigma_i \cap \gamma 6 = \sigma_i \text{ and } \sigma_i \cap \gamma = 6\emptyset, \text{ for } i=1,2, \ldots, m\}|$.

Partition Theorem (Theorem 1): Given a set P of n points in $\mathbb{R}^d$, for some fixed dimension d, a family of ranges $\Gamma$, and a parameter $r \leq n$, an elementary cell partition $\Pi=\{(P_1, \sigma_1), \ldots, (P_m,\sigma_m)\}$ can be computed in randomized expected time $O(nr+r^3)$ such that:

1. $(n/r) \leq P_i < h(n/r)$ for every i and constant h.
2. The crossing number of $\Pi$ is $O(r^{1-1/d})$.

Having set forth some terminology and concepts of range searching and computational geometry above, a problem addressed by the mechanisms of the illustrative embodiments, e.g., FHE enabled search engine 240 in FIG. 2, may be represented as follows: given a set of n points $P \subset \mathbb{R}^d$, a family of ranges $\Gamma$ and a function $f$, a data structure is to be constructed that computes efficiently $f(P \cap \gamma)$ for any $\gamma \in \Gamma$. The function $f$ is a function $f: 2^P \to D$ that maps a subset of P to a valued $\in D$ from a domain D. In the solution to this problem it is also required that a function g: $D \times D \to D$, where $f(A \cup B)=g(f(A)f(B))$, for $A,B \subseteq P$ and $A \cap B=\emptyset$. In other words, any function may be computed on $P \cap \gamma$ by dividing the function into two subsets and then joining the 2 subresults. The definition of $f$, g and D vary with the underlying problem. Several use cases for $f$ and g are:

Counting: Return $|P \cap \gamma|$, by setting $f(A)=|A|$ and g(a,b)=a+b.

Reporting: Return $P \cap \gamma$, by setting $f(A)=A$ and g(a,b)=a$\cup$b.

Averaging: Return ($\Sigma_{p \in P \cap \gamma}$ d(p), $|P \cap \gamma|$), where d(p) is data associated with $p \in P$, by setting $f(A)=(\Sigma_{a \in A}$ a,$|A|$) and g(a,b)=a+b (here a and b are 2d vectors).

With this problem statement in mind, the illustrative embodiments consider a security model with four primary parties: (1) the key owner; (2) the owner of the data set $P \subset \mathbb{R}^d$ who also builds the partition tree; (3) the owner of a range $\gamma \in \Gamma$ and (4) the cloud. A single entity may operate as multiple ones of these parties, or there may be separate entities for each party. However, it is required that the key-owner and the cloud do not collude.

For example, Alice may be a key owner and a range owner, an ice cream truck company, or ride share company (using the previously mentioned examples) may be the data owner, and a cloud service provider, e.g., International Business Machines (IBM) Corporation, may be the cloud party. In another example, a hospital may be the key owner and data owner (of medical data, an analytics company may be the range owner (e.g., being able to predict people who are in risk of a cardiovascular arrest), and a web services platform provider, e.g., again IBM, may be the cloud party. Further example scenarios include:

(1) Party A has a database (Party A is the owner of the data set and the cloud). Party B wants to query the database (Party B is the key owner and range owner) so they encrypt the query and send to Party A. Party A runs the query under FHE and returns the encrypted result to Party B who decrypts it;

(2) Party A has a database. Party B has a secret algorithm to extract certain records from the database. Thus, Party A encrypts the database sends to Party B who applies the query on the encrypted database. The encrypted output is sent to Party A who then decrypts the output;

(3) same as (1) but here Party A encrypts the database with Party B's key and uploads to the cloud. All computation happens on the cloud; and (4) same as (2) but here Party B uploads the encrypted database to the cloud. Party B also encrypts the range and sends it to the cloud. All computation happens on the cloud. Of course other scenarios may also exist without departing from the spirit and scope of the present invention, with the above being examples.

In the example of FIG. 2, rather than having the data owner, i.e., backend data store 250 provider, as a separate entity from the cloud service provider system 230, they are shown as the same entity such that the partition tree is generated by the partition tree generator 242, however these parties may in fact be different entities such that the data owner of the backend data stores 250 may implement the partition tree generator 242 and upload an encrypted partition tree data structure to the cloud service provider system 230 for implementation in the FHE enabled search engine 240.

In some illustrative embodiments, the data owner encrypts their partition tree and uploads the encrypted partition tree to the cloud. The range owner encrypts their range and uploads it to the cloud. The cloud, e.g., cloud service provider system 230, then computes $f(P \cap \gamma)$ under FHE and sends the results of the computation to the key owner, e.g., client 210, 212, to be decrypted. The semantic security of FHE guarantees that the cloud learns nothing on the content of $\gamma$ and P. This range searching process is outlined in FIG. 3 as the Range Searching Protocol, also referred to as Protocol 1.

As noted above, the illustrative embodiments operate on tree data structures, such as partition trees, which may be generated for backend data stores 250 by the partition tree generator 242, for example. In the description of partition trees herein, v is used to denote a node in the partition tree and dot (".") denotes members of v. Thus, for example, v.child[1], . . . , v.child[m] are the children 1 to m of v. The root of the partition tree is referred to as root and the height of a node v is the maximal number of nodes on the path from the node v to the root.

Each node v in a partition tree is associated with a subset subset $S_v \subseteq P$. This subset is not kept as a field of v. Each node in the partition tree keeps these fields as attribute data for the node:

1. child[1], . . . , child[m]—the children nodes (of inner nodes).
2. $[[f(S_v)]]$—the encryption off applied on the subset associated with v.
3. $[[\sigma]] \subset \mathbb{R}^d$—the simplex (a spatial configuration of n dimensions determined by n+1 points in a space of dimension equal to or greater than n) of the partition theorem associated with $S_v$.

A partition tree additionally has these properties:
$S_{root}=P$, i.e., the root is associated with P.

$$S_v \subset v.\sigma.$$

If v is a leaf then $|S_v|=1$.
The children of v are derived from a simplicial partition of $S_v$, that follows from the partition theorem (Theorem 1).

For a simplicial partition $\Pi=\{(P_1,\sigma_1), \ldots, (P_m,\sigma_m)\}$ of $S_v$ set v to have m children with:

$$Sv.child[i] = P_i,$$

and $$v.child[i].\sigma = \sigma_i.$$

For any inner node v, every range $\gamma \in \Gamma$ intersects at most $\xi$ of its children's simplices $v.child[1].\sigma, \ldots, v.child[m].\sigma$. The value of $\xi$ depends on $\Gamma$ and on how $S_v$ is partitioned.

The partition tree may be built using different constructions for the particular use cases and implementations. As examples, partition tree constructions for three different use cases may include: (1) ranges that are 1 dimensional, i.e., $\gamma=\{x \in R | a < x < b\}$; (2) general semi-algebraic ranges in $\mathbb{R}^d$; and (3) ranges that are hyperboxes parallel to the axes $\gamma=\{(x_1, \ldots, x_d) \in R^d | a_1 < x_1 < b_1 \wedge \ldots \wedge a_d < x_d < b_d\}$.

In the first case, when d=1, $P=(p_1, \ldots, p_n)$ where $p_1 < \ldots < p_n \in R$, $\Gamma$ is the family of all segments and $f$, g functions are as mentioned above. Also let $0 < r < n$ be a parameter. To build the partition tree, the process starts by setting v=root and $S_v = S_{root} = P$. Then, the process performs the following operations:

Set $m=\min(r, |P|)$.

Set $v.\sigma=[a,b]=\{x | p_1 \leq x \leq p_n\}$.

Partition $S_v$ into $(P_1,\sigma_1), \ldots (P_m,\sigma_m)$, where for $1 \leq i \leq m-1$, set $$P_i = \left(p_{\lfloor \frac{(i-1) \cdot n}{m} \rfloor + 1}, \ldots, p_{\lfloor \frac{i \cdot n}{m} \rfloor}\right)$$

$$\sigma_i = \left[p_{\lfloor \frac{(i-1) \cdot n}{m} \rfloor + 1}, p_{\lfloor \frac{i \cdot n}{m} \rfloor}\right],$$

and also set $$P_m = \left(p_{\lfloor \frac{(m-1) \cdot n}{m} \rfloor + 1}, \ldots, p_n\right)$$

$$\sigma_m = \left[p_{\lfloor \frac{(m-1) \cdot n}{m} \rfloor}, p_n\right].$$

Set $v.f=f(P)$.

Thus, with the above process, the set is split into r equal continuous subsets. The process recursively builds a sub-tree for v.child[i] until $|P_i|=1$ is obtained.

An important property of a partition tree is that every range $\gamma \in \Gamma$ intersects at most $\xi$ simplices from v.child[1].$\sigma, \ldots$, v.child[m].$\sigma$. If the range intersects a simplex (i.e., is not contained and does not avoid the simplex), then it is not known if the points inside the simplex are all inside the range or all outside the range, and thus, the process needs to recurse into the subtree for that simplex. For the 1-dimensional case, $\xi=2$, as follows from the following lemma:

Lemma 1. Let $p_1 \leq \ldots \leq p_n \in R$ be n ordered real numbers partitioned into a partition $\Pi=\{(P_1,\sigma_1), \ldots, (P_r,\sigma_r)\}$ as described above, then $\gamma=\{x \in R | a < x < b\}$ crosses at most 2 simplices.

Proof. To cross a simplex (in 1D a simplex is a segment) $\sigma=\{x \in R | p_i \leq x \leq p_j\}$ exactly one of these conditions must be true:

$$a < p_i \wedge p_i < b < p_j,$$

or $$p_i < a < p_j \wedge p_j < b.$$

Since $p_1 \leq \ldots < p_n$ this can happen for at most 2 simplices.

When building partition trees for dimensions greater than 1, let $P \subset \mathbb{R}^d$ be a subset with n points where d>1, $\Gamma$ be a range family and $f$ a function as mentioned above. Also let r>0 be a parameter. The process starts by setting v=root and $S_v = S_{root} = P$. Then, the process involves the following operations:

Use the partition theorem (Theorem 1) discussed above to partition $S_v$ into $\Pi=\{(P_1,\sigma_1), \ldots (P_m,\sigma_m)\}$, where $(n/r) \leq |P_i| < h(n/r)$, for every i (and therefore $r/h \leq m \leq r$).

Set $S_{v.child[i]}=P_i$ and $v.child[i].\sigma=\sigma_i$.

Set $v.f=f(P)$, where $f(P)$ has a constant description complexity.

Recursively build a sub-tree for each v.child[i] until $|P_i|=1$ is obtained.

From the partition theorem (Theorem 1) above, it follows that at any (inner) node v, every range $\gamma \in \Gamma$ intersects at most $O(r^{1-1/d})$ of the simplices v.child[1].$\sigma, \ldots$, v.child[m].$\sigma$.

Figure 4:
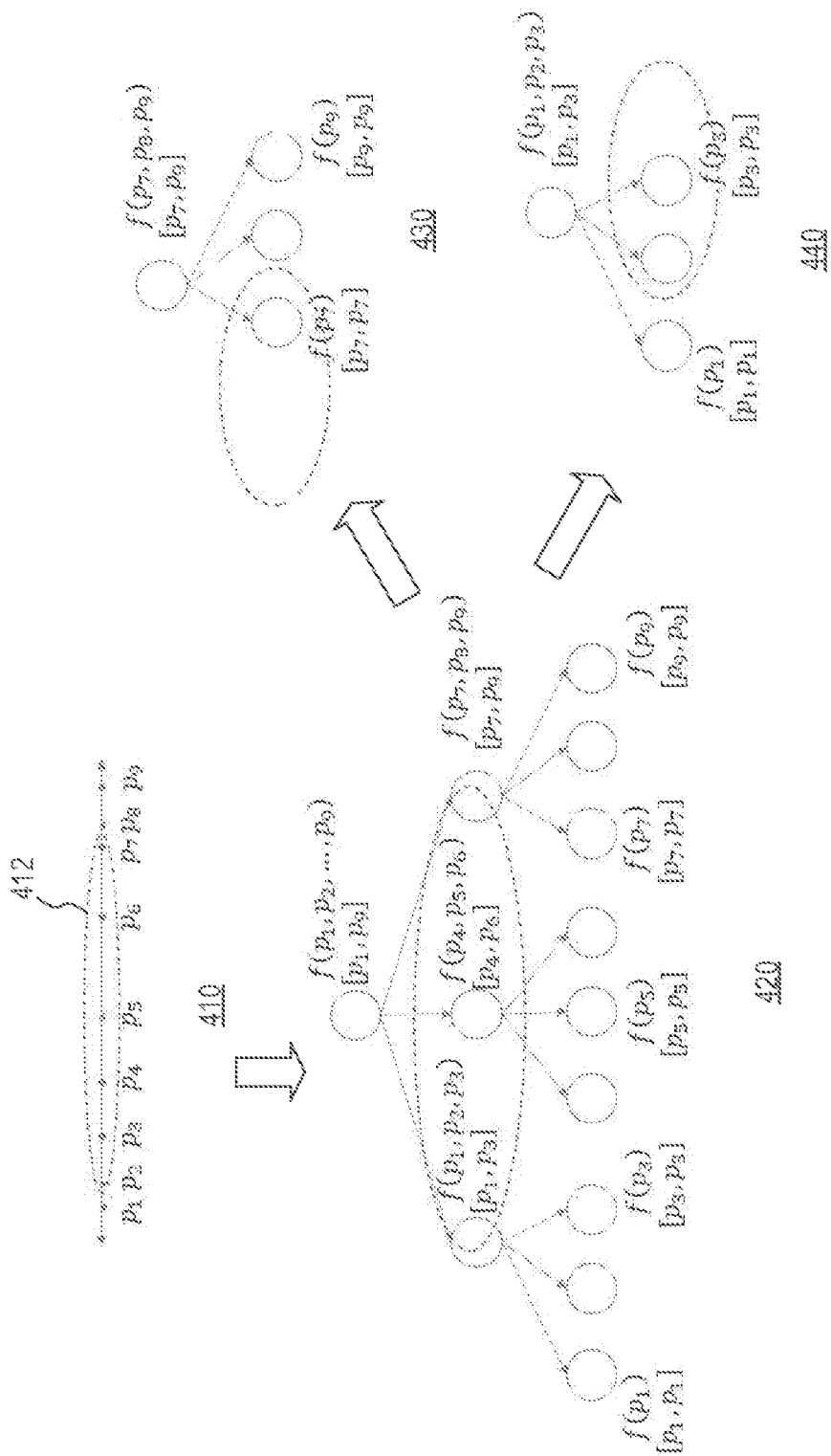
FIG. 4 illustrates an example of an application of the copy-and-recurse functionality on a partition tree in accordance with one illustrative embodiment.

Given a partition tree, such as may be generated by the partition tree generator 242 in FIG. 2, for example, in a manner as set forth above with regard to one or more of the illustrative embodiments, as part of the range search of the partition tree data structure, the copy-and-recurse engine 246 operates to perform a copy-and-recurse operation on the partition tree to facilitate performance of an encrypted range search operation. FIG. 4 shows an example of an application of the copy-and-recurse functionality on a partition tree for the case where $P \in \mathbb{R}$ and $\Gamma$ is the family of all segments (in one dimension, a range with constant description complexity is referred to as a segment). In the first portion 410 there is shown 9 points $p_1 < \ldots < p_9 \in \mathbb{R}$ and with the dashed line 412 illustrating the boundaries of a segment $\gamma=\{x | a < x < b\}$, where $p_1 < a < p_2$ and $p_7 < b < p_8$.

In the second portion 420, there is illustrated the partition tree 420 built for $P=\{p_1, \ldots, p_9\}$. Next to each node v is shown $v.f=f(S_v)$ and $v.\sigma=[p_i,p_j]$ (to improve readability this is omitted for some leaves), where v.f is the function applied on the subset of points that the node represents and v.$\sigma$ is the simplex that contains the points the node represents (as computed by the partition theorem). When comparing (under FHE) $\gamma$ to the 3 children of root, it is determined that root.child[1].$\sigma$ and root.child[3].$\sigma$ cross $\gamma$ (by construction it is guaranteed that at most 2 simplices cross $\gamma$) and root.child [2].$\sigma$ is contained in $\gamma$. Therefore, $f(p_4,p_5,p_6)$ can be added to the output by taking $o'=g(f(p_4,p_5,p_6),o)$. Using the copy-and-recurse operation of the illustrative embodiments, the left and right children of the root (under FHE) are copied into a buffer and the operation recurses into then.

In the third portion 430 of FIG. 4, the copy of the root's right child is shown. It is found that $[p_7,p_7] \subset \gamma$ and $f(p_7)$ can be added to the output by taking $o'=g(f(p_7),o)$. In the fourth portion 440, the root's left child copy is shown. It is found that $[p_2,p_2],[p_3,p_3] \subset \gamma$ and $f(p_2)$ and $f(p_3)$ can be added to the output by taking $o'=g(f(p_2),g(f(p_3),o))$.

It should be appreciated that these additions or copying operations may be accomplished by the copy and recurse operation based on a copy-and-recurse matrix built by the copy-and-recurse matrix generator 248 using a procedure referred to as BuildCopyAndRecurseMatrix (also referred to as Algorithm 4), as discussed hereafter with reference to FIG. 8. The copy-and-recurse matrix is multiplied with the vector to thereby copy the relevant $\xi$ elements.

Keeping a secondary structure at each node may be used to answer range queries when the ranges are conjunctions of algebraic ranges. Under FHE, a secondary data structure may be kept in each node v constructed v.D. Since the size of the partition tree is near linear, keeping this secondary structure does not change the size complexity of the primary data structure. Using a secondary data structure, range search queries can be answered more efficiently when $\Gamma$ is a family of a conjunction of ranges. For example, consider hypercubes i.e., $\gamma = \{x \in R^d | a_i \leq x_i \leq b_i$ for $i=1, \ldots, d\}$. To construct the hypercube, a primary data structure for ranges $\gamma_1 = \{x \in R^d | a_1 < x_1 < b_1\}$ is generated with a secondary data structure for ranges $\gamma_2 = \{x \in R^d | a_2 < x_2 < b_2\}$, etc. Here, instead of having a one-structure tree of points in $\mathbb{R}^d$, there is a d-structure partition tree where each structure is of points in $\mathbb{R}$. This leads to improved circuit size, where the circuit size is $O(n+t*n^\epsilon)$ instead of $$O\left(n + t*n^{1-\frac{1}{d}+\epsilon}\right).$$

This case is especially interesting because this improves the circuit size of many database queries.

The partition trees may be transformed into partition trees that are "FHE-friendly" partition trees that can be more efficiently used with FHE. An example algorithm for transforming such partition trees into FHE friendly partition trees is shown in FIG. 5 and is referred to as "Algorithm 2: FillTree" because it fills in the partition tree with empty nodes, as discussed hereafter. This algorithm may be implemented in logic of the partition tree generator 242 in FIG. 2, for example.

In a partition tree T that is built for a set P, inner nodes may have different numbers of children, and leaves may be at different distances, or heights, from the root. This happens since Theorem 1 generates a simplicial partition of size r/h<m<r at each node. Since the number of children m depends on P, the structure of T may leak information on P. It is therefore, important to hide the structure of the partition tree T. This raises 2 issues: (1) Security: The structure of an unbalanced, non-full tree may leak information on the input; and (2) Input oblivious: To be input oblivious the parameters of the nodes visited when traversing the tree (e.g., number of children) must not leak.

To address these issues, the partition tree may be converted to a full tree, where a full tree is one where each node has a maximal number of children and each leaf node is at the maximal height or distance from the root node. The conversion or transformation may be accomplished by adding empty nodes to the initial partition tree in accordance with a methodology of the illustrative embodiments, such as the example FillTree algorithm, also referred to as Algorithm 2, shown in FIG. 5. First, an empty node is defined as a node v that is associated with an empty set, $S_v = \emptyset$ and the simplex it keeps is a degenerate empty simplex, $v.\sigma = \emptyset$.

To transform a partition tree to a FHE-friendly partition tree, empty nodes are repeatedly added until there is a full partition tree. To see the maximal span of inner nodes and maximal height of leaf nodes, recall that when Theorem 1 partitions $S_v$ into a simplicial partition $\Pi = \{(P_1, \sigma_1), \ldots, (P_m, \sigma_m)\}$, with $S_v/r \leq P_i < h(S_v/r)$, where h is a constant that depends on $\Gamma$. In this case, r/h≤m≤r, where the extremes are when $|P_i| = h*S_v/r$ for all i and when $|P_i| = S_v/r$, for all i. The height of a leaf, v, is therefore $[\log_r n] \leq \text{height}(v) \leq [\log_{r/h} n]$ where the extremes are when $|P_i| = S_v/r$, for all i and all nodes v, and when $|P_i| = h*S_v/r$, for all i and all nodes. The maximal span is therefore r and the maximal height is $[\log_{r/h} n]$. Thus, it follows that to hide the structure of a partition tree T, empty nodes need to be added until (1) all inner nodes have r children and (2) the distance from the root, i.e. the height, to each leaf is $\log_{r/h} n$ where h is a constant that comes from the partition theorem (Theorem 1). An example algorithm, i.e., the FillTree algorithm (Algorithm 2) is shown in FIG. 5 as one example for adding empty nodes to a partition tree to hide the structure of the tree.

FIG. 6 is an example of a partition tree and its full partition tree version after empty nodes have been added to it in accordance with one illustrative embodiment. As shown in FIG. 6, to make a partition tree FHE-friendly it is converted into a full tree. In a first portion 610 of FIG. 6, a partition tree for 4 points $p_1, \ldots, p_4$ is shown. In the second portion 620 of FIG. 6, a FHE-friendly version of the same partition tree is shown. In order to be FHE-friendly, all of the inner nodes need to have the same number of children, so an empty node 630 is added to the root. All leaves also need to be at the same distance from the root, and therefore, empty nodes 640 are added to the rightmost node (that represents $p_4$) and empty nodes 650 are added as children of the newly added child node 630 of the root. All empty nodes 630-650 have the value $v.f = f(\emptyset)$ and empty bounding simplex $s_0$ (for example, when d=1, $s_0 = \{x | 1 < x \text{ and } x < 0\}$).

Lemma 2 (Height and Spanning Number). Let P be a set of n points in $R^d$, $\Gamma$ a family of ranges r<n and h a parameter such that any simplicial partition of $P^0$ with respect to $\Gamma$. $\Pi = \{(P'_1, \sigma_1), \ldots, (P'_m, \sigma_m)\}$ satisfies $|P_I^0|/r < |P_I^0| < h \cdot |P_I^0|/r$ and let $T = \text{FillTree}(T^0, n, r, h)$, where $T^0$ is a partition tree built for P and $\Gamma$, then the height of T is $\log_{r/h} n$ and it has a total of $$n^{\frac{1}{1-\log_r h}} = O(n^{1+\epsilon})$$

nodes.

Proof. From the partition theorem (Theorem 1), at each node v there is a partition with $|P_i| \leq h \cdot n_v/r$. It follows that the height of the tree is at most $[\log_{r/h} n]$. The number of children at each node is at most r. The number of nodes is therefore $$r^{[\log_{r/h} n]} = r^{\left[\log_r n \frac{1}{1-\log_r h}\right]} = O\left(n^{\frac{1}{1-\log_r h}}\right) = O(n^{1+\epsilon}).$$

Lemma 3. Let $P_1, P_2 \subset R^d$ be 2 sets of points with in $|P_1| = |P_1| = n$ and $T'_1, T'_2$ being 2 partition trees built for $P_1$ and $P_2$ with the same parameters r, h then $T_t$ and $T_2$ have the same structure, where $T_i = \text{FillTree}_{n,r,h}(\text{Ti}')$.

Proof. The number of children in each node of $T_1'$ and $T_2'$ is at most r for both trees and does not depend on P. In addition, the height of $T_1'$ and $T_2'$ is at most $[\log_{r,h} n]$. Since the FillTree algorithm adds nodes to have a full tree of height $[\log_{r/h} n]$ where each inner node has exactly r children $T_1$ and $T_2$ have the same structure.

Lemma 3 guarantees that the structure of T=FillTree(n,r, h,T') does not leak information on P. However, the content of fields of nodes in T may still leak information on P.

Specifically, v.f and v.σ leak information on P. In a privacy preserving application, v.f and v.σ are encrypted for every node in T. The notation [[v.f]] and [[v.σ]] are used to denote these values are encrypted. Applying the FillTree algorithm on a partition tree and then encrypting v.f and v.σ guarantees that T does not leak data on P.

FIG. 7 is a diagram that shows an example algorithm, referred to as the privacy preserving range search (PPRangeSearch), also referred to as Algorithm 3, that operates to perform privacy preserving range queries in accordance with one or more illustrative embodiments. The PPRangeSearch algorithm shown in FIG. 7 may be implemented in logic of the partition tree range search engine 244 in FIG. 2, for example. This logic may also invoke the copy-and-recurse operations of the copy-and-recurse engine 246. The PPRangeSearch algorithm checks for the presence of a variety of conditions using FHE, where such checking for conditions is done by applying a polynomial that equals 1 if the condition is met and 0 otherwise. In the PPRangeSearch algorithm (Algorithm 3), two functions are utilized, i.e., IsContaining and IsCrossing which will now be explained in greater detail.

The first function, $IsContaining_{d,\Gamma}(\sigma,\gamma)$: This function gets as input encrypted simplex and range, $\sigma,\gamma \subset \mathbb{R}^d$, where d is a parameter and the range is taken from a family of ranges, $\gamma \in \Gamma$. The value of IsContaining is a ciphertext c, where c=1 if $\sigma \subseteq \gamma$ and c=0 otherwise. The implementation details of $IsContaining_{d,\Gamma}$ depend on d and $\Gamma$. Consider, for example, the case d=2 and $\Gamma$ being the set of all axis-parallel rectangles. In this case, σ is a triangle given by 3 endpoints $(\sigma.a_x, \sigma.a_y, \sigma.b_x, \sigma.b_y, \sigma.c_x, \sigma.c_y)$, and $\gamma=\{p \in \mathbb{R}^2 | \gamma.a_x < p_x < \gamma.b_x$ and $\gamma.a_y < p_y < \gamma.b_y\}$ is an axis-parallel rectangle given by its endpoints $(\gamma.a_x, \gamma.a_y)$ and $(\gamma.b_x, \gamma.b_y)$. Then, a range γ contains a simplex iff (if and only if) it contains all 3 corners (this follows from the convexity of γ and σ). Checking this condition can be implemented as:

IsContaining(σ,γ)=IsPointIn(γ,σ.a)·IsPointIn(γ,σ.b)·IsPointIn(γ,σ.c), where:

IsPointIn(γ,p)=IsBetween(γ.$a_x$,$p_x$,γ.$b_x$)·IsBetween(γ.$a_y$,$p_y$, γ.$b_y$), equals 1 if p∈γ and 0 otherwise;

IsBetween(a,b,c)=IsSmaller(a,b)·IsSmaller(b,c), equals 1 if a<b<c and 0 otherwise; and IsSmaller(a,b)=1, if a≤b and 0 otherwise compares a and b under FHE.

The second function, IsCrossing(σ,γ): This function gets as input an encrypted simplex and range, $\sigma,\gamma \subset \mathbb{R}^d$, as above. The value of IsCrossing is a ciphertext c, where c=1 if γ crosses σ (i.e., intersects but not contains) and c=0 otherwise. The implementation details of IsCrossing depend on d and $\Gamma$. Continuing the example above, IsCrossing can be implemented as:

$$IsCrossing(\sigma, \gamma) =$$
$$(1 - IsPointIn(\gamma, \sigma.a)) \cdot IsPointIn(\gamma, \sigma.b) \cdot IsPointIn(\gamma, \sigma.c) +$$
$$IsPointIn(\gamma, \sigma.a) \cdot (1 - IsPointIn(\gamma, \sigma.b)) \cdot IsPointIn(\gamma, \sigma.c) +$$
$$IsPointIn(\gamma, \sigma.a) \cdot IsPointIn(\gamma, \sigma.b) \cdot (1 - IsPointIn(\gamma, \sigma.c)) +$$
$$IsPointIn(\gamma, \sigma.a) \cdot (1 - IsPointIn(\gamma, \sigma.b)) \cdot (1 - IsPointIn(\gamma, \sigma.c)) +$$
$$(1 - IsPointIn(\gamma, \sigma.a)) \cdot IsPointIn(\gamma, \sigma.b) \cdot (1 - IsPointIn(\gamma, \sigma.c)) +$$
$$(1 - IsPointIn(\gamma, \sigma.a)) \cdot (1 - IsPointIn(\gamma, \sigma.b)) \cdot IsPointIn(\gamma, \sigma.c)$$

It should be noted that, when computing these functions under approximated schemes (such as CKKS), special care should be given to the precision. Specifically, since CKKS is an approximated scheme, the value of these function is 1+ϵ, where |ϵ|<e and e depends on the complexity of γ and the parameters of the key. The value e can be made arbitrarily small using noise cleaning techniques, that have additional cost. This may incur additional costs to the running time.

In addition, since a polynomial approximation function may be used, functions such as IsSmaller have a correct value only within a specific range. For example, IsSmaller equals an arbitrary value IsSmaller(a,b)∈[−ϵ, 1+ϵ] when |a−b|<δ, for some constant δ which can be made arbitrarily small by taking a higher degree polynomial for IsSmaller. Another way to compute these functions is to (1) use scheme switching to exact schemes (such as BGV, BFV or TFHE); or (2) perform the comparison in exact schemes and then switch back to CKKS.

With regard to complexity, again it should be noted that the description complexity of σ is O(1). Once $\Gamma$ is fixed, the description complexity of γ is also constant, however, computing these functions depends on the complexity of the ranges. For example, tetrahedron ranges ($\gamma=\{x \in \mathbb{R}^3 | x*a_1 < b_1$ and $x*a_2 < b_2$ and $x*a_3 < b_3\}$, where $a_1, a_2, a_3 \in \mathbb{R}^3$ and $b_1, b_2, b_3 \in \mathbb{R}$ are the parameters defining γ and x*ai indicates the inner product) take less time to compare to than dodecahedron ranges. In addition, from the practical perspective, comparing a simplex (or a point) to γ is what consumes most of the time and it makes sense to count the time they cost separately. Therefore, the size and depth of the arithmetic circuit that computes IsContaining and IsCrossing are denoted by t and $\ell$, respectively.

Referring again to FIG. 7 and the PPRangeSearch algorithm (Algorithm 3), as shown, the algorithm implements a privacy preserving range search using the IsContaining and IsCrossing functions. These functions may be performed using the copy-and-recurse operation (see lines 11-13) in accordance with one or more illustrative embodiments. As shown in FIG. 7, the PPRangeSearch algorithm has public parameters of n, d, $\Gamma$, ξ, and h, where n=|P| is the number of points, d is the dimension of the space (i.e., $P \subset \mathbb{R}^d$), $\Gamma$ is the range family the partition tree was built for, ξ is a bound on the crossing number of a range $\gamma \in \Gamma$, and h is a parameter determined by the partition theorem (Theorem 1). From this, it follows that the PPRangeSearch algorithm needs to recurse into at most ξ children at each inner node.

The inputs for the PPRangeSearch algorithm include T and γ, where T is a partition tree (or a subtree) and γ is a range. A plaintext notation for T is used because the structure of the partition tree (e.g., depth and number of children) is not encrypted, however it should be noted that the fields T.f and T.σ, which depend on the private data, are encrypted. The output of the algorithm is x where x=f(P∩γ).

The PPRangeSearch algorithm operates recursively. When the PPRangeSearch algorithm is called, it is called to operate on the partition tree T. The PPRangeSearch algorithm then calls itself recursively with a subset of subtrees under the root of T as input. The recursion stops when the PPRangeSearch algorithm reaches a leaf node of the partition tree T. While traversing the partition tree T the PPRangeSearch algorithm collects v.f from various nodes and uses the function g to aggregate these values.

The improved efficiency of the PPRangeSearch algorithm comes, at least in part, from guaranteeing that at most ξ children need to be recursed into. This is done under FHE using copy-and-recurse, i.e., by making a copy of ξ children and their subtrees (among them are the children that need to be recursed into) and recursing into these ξ copies. As noted previously, the copy-and-recurse operation may utilize a buffer to achieve the copy-and-recurse operation.

The PPRangeSearch algorithm, in accordance with one illustrative embodiment, i.e., Algorithm 3 of FIG. 7, starts with checking for the stopping condition for the recursion (Line 1). If the node v is a leaf node of the partition tree, the algorithm checks whether v.σ⊆γ (Line 2). This is done by calling the above described function IsContaining which returns the ciphertext [[c]], where c=1 if v.σ⊆γ and 0 otherwise. The ciphertext [[c]] is then used by the algorithm to output $f(S_v)$ or $f(\emptyset)$ (Line 3).

In the case where v is an inner node (Lines 5-17) the PPRangeSearch algorithm checks each child to determine whether its bounding simplex, σ, contains γ (Line 7). The simplex is a generalization of a polyhedron to arbitrary dimensions, e.g., a 0-dimensional simplex is a point, a 1-dimensional simplex is a line segment, a 2-dimensional simplex is a triangle, a 3-dimensional simplex is a tetrahedron, and a 4-dimensional simplex is a 5-cell.

The algorithm uses the function g to aggregate [[v.child[i].f]] for the children that are contained in γ (Line 8). Then, the algorithm checks which child's simplex cross γ (Line 10). These values are kept in a r-dimensional binary vector Cont. Since $S_{v.child[i]} \subset v.\sigma \subset \gamma$, the algorithm can then aggregate $f(S_{v.child[i]})$ without checking the points of $S_{v.child[i]}$. Then, using the BuildCopyAndRecurseMatrix algorithm (see Algorithm 4 described hereafter with regard to FIG. 8) the PPRangeSearch algorithm computes M(Line 11) which is a matrix that compacts vectors v, i.e., $M \cdot v \in R^\xi$ has elements from v that correspond to elements of Cross with a value of 1 (padded with 0's if there are less than ξ 1's in Cross). Using M, v.child (of size r) is compacted into a vector of ξ<r copies of children (Line 12). Here v.child is regarded as a vector with r elements (v.child[1], . . . , v.child[r]), i.e., children of v and their subtrees. Multiplying by M, a vector of child is obtained with only ξ elements that are copies of v.child. Similarly, Cross is compacted into Cross' (line 13).

The PPRangeSearch algorithm then recurses into the subtrees whose simplices cross γ to check a finer partition (i.e., into smaller sets) of their points (lines 14-16). From the properties of the partition tree, the number of these children is at most ξ. In Line 16 the copy of ξ children is processed to aggregate $f(S_{v.child[i]} \cap \gamma)$ for the children whose simplices cross γ. $f(S_{v.child[i]} \cap \gamma)$, which is computed under FHE by recursing into the subtree of v.child[i]. The encrypted output [[x]] is then output by the PPRangeSearch algorithm.

As noted above, one important aspect of the illustrative embodiments is the copy-and-recurse operation, performed by the copy-and-recurse engine 246 in FIG. 2, which is facilitated by the copy-and-recurse matrix that is generated by the copy-and-recurse matrix generator 248. The copy-and-recurse matrix generator 248, in accordance with some illustrative embodiments, may implement the algorithm, referred to as the BuildCopyAndRecurseMatrix algorithm, an example of which is shown in FIG. 8.

As shown in FIG. 8, the BuildCopyAndRecurseMatrix algorithm, also referred to as Algorithm 4, is a function that generates the copy-and-recurse matrix, M, used in the PPRangeSearch algorithm discussed above, e.g., in line 11 of FIG. 7. The called function that initiates Algorithm 4 has 2 parameters r and ξ. In addition, Algorithm 4 receives as input, an encrypted vector [[c]], where c ∈ {0, 1}$^r$ and ξ is an upper bound of the number of non-zero elements in c. The output of Algorithm 4 is a matrix M ∈ {0, 1}$^{\xi \times r}$, such that for any vector x ∈ $\mathbb{R}^r$:

$$(M \cdot x)[j] = \begin{cases} x[i] & \text{if } c[i] \text{ is the } j\text{-th value of } 1. \\ 0 & \text{if } c[i] \text{ has less than } j \text{ non-zero elements.} \end{cases}$$

To understand how Algorithm 4 works it is noted that M[i, j]=1 iff c [i] is the j-th cell with a value of 1. Algorithm 4 starts by setting (Line 2):

$$M[1, i] = c[i] \prod_{k=1}^{i-1} (1 - c[k]).$$

One can see that M[1, i]=1 iff c[i] is the first non-zero element in c, i.e., c[i]=1 and c[k]=0 for 1≤k<i. Then, Algorithm 4 continues by setting (Line 5):

$$M[j, i] = c[i] \sum_{k=1}^{i-1} \left( M[j-i, k] \prod_{h=k+1}^{i-1} (1 - c[h]) \right).$$

which is now explained. M[j−i] [k]=1 iff c[k] is the (j−1)-st element with a value of 1. $\Pi_{h=k+1}^{i-1}(1-c[h])=1$ iff c[k+1]= . . . =c [i−1]=0. Putting these together and summing for all values of k<i one gets that $\Sigma_{k=1}^{i-1}(M[j-i, k]\Pi_{h=k+1}^{i-1}(1-c[h])=1$ if there are exactly j−1 values of 1 in c[1], . . . , c[i−1]. Multiplying this by c[[i], one obtains that M[j,i]=1 iff c[i] is the j-th value of 1.

The Analysis of the size and depth of Algorithm 4, i.e., the BuildCopyAndRecurseMatrix, is summarized in the following lemma.

Lemma 4. Computing M[col, row] for 1≤col≤ξ and 1≤row≤r can be done with a circuit of depth O(ξ·log r) and size O(ξ·r$^2$).

Proof. The lemma is proved by induction on x. For ξ=1 one has M[1, row]:=c [row]·$\Pi_{i=1}^{row-1}(1-c[i])$ which can be done in a circuit of depth O(log row) and size O(row). Computing for all rows in parallel, one gets a circuit of depth O(log r) and size O(r$^2$). Assuming it holds for all ξ'<ξ it is proved that this holds for ξ. Since one has M[ξ, row]=c [row]$\Sigma_{k=1}^{row-1}(M[\xi-i,k]\Pi_{h=k+1}^{row-1}(1-c[h]))$, this can be done with a circuit whose depth is O(log r+(ξ−1) log r) and size is O(r$^2$+(ξ−1)r$^2$), which proves the claim.

With regard to the partition tree range search engine 244 operation, e.g., performance of the PPRangeSearch algorithm (Algorithm 3 in FIG. 7), which calls Algorithm 4, the size and depth of the circuit that realizes the IsContaining and IsCrossing functionality of the range search algorithm is denoted by t, ϑ respectively. The space of the tree data structure may then be analyzed as follows:

Lemma 5. Let P,T be as in Lemma 2, where |P|=n and r<n is a parameter, then T needs space of O(n$^{1+\epsilon}$), where the value of ϵ depends on r and can be made arbitrarily small.

Proof. From Lemma 2 the number of nodes is $$n^{\frac{1}{1-\log_r h}}.$$

Since O(1) data are kept with each node, the total space is $O(n^{1+\epsilon})$, where $\epsilon=(\log_r h)/(1-\log_r h)$ can be made arbitrarily small by choosing a large r.

Turning now to analyzing the size and depth of the circuit that computes a range search query in accordance with one or more of the illustrative embodiments, consider Theorem 2 as follows:

Theorem 2. Let $P \subset \mathbb{R}^d$ be a set of n points, $\Gamma \subset 2^{\mathbb{R}^d}$ a family of semi-algebraic ranges, T a full partition tree as output from Algorithm 2, $f$, $g$ functions such that $f$ $(A \cup B) = g(f(A), f(B))$, when $A \cap B = \emptyset$, and t and $\ell$ are the size and depth of the circuit that compares a range to a simplex, then given $\gamma \in \Gamma$, PPRangeSearch (Algorithm 3) securely evaluates $f(\gamma \cap P)$ in a circuit whose size is $O(n+t \cdot n^{1-1/d+\epsilon})$ and depth is $O(\ell \cdot \log n)$, where t and l are the size and depth of the circuit that compares a simplex to a range.

Informally, the correctness of Theorem 2 follows from the plaintext algorithm that Algorithm 3 implements. The bound on the circuit size is proved by solving the recursion formula of the circuit size. The circuit depth is proved by induction on the tree height. It should be appreciated that Algorithm 3 deviates from a plaintext algorithm in at least 3 primary ways: (1) it adds empty nodes; (2) it always recurses into $\xi$ children (for inner nodes) and (3) it uses the Cross and Cont indicator arrays to conditionally aggregate values into the output.

At each inner node, v, Algorithm 3: (1) computes IsContaining and IsCrossing r times; (2) builds a copy-and-recurse matrix M; (3) copies $\xi$ children of v; and (4) recurses into $\xi$ children of v. Computing all of the IsContaining and IsCrossing computations takes $O(t \cdot r)$ time. From Lemma 4, computing the copy-and-recurse matrix takes $O(r^2 \cdot \xi)$. The size of each child (including its subtree) is $$O\left((n/r)^{\frac{1}{1-\log_r h}}\right)$$

and copying $\xi$ children (out of r) takes $$O\left(r \cdot \xi \cdot (n/r)^{\frac{1}{1-\log_r h}}\right).$$

It follows that the time to compute a range query is given by the following recursion rule:

$$T(n) \leq O(r \cdot t) + O(r^2 \cdot \xi) + O\left(r \cdot \xi \cdot (n/r)^{\frac{1}{1-\log_r h}} + \xi \cdot T(h \cdot n/r)\right)$$

This solves to:

$$T(n) = \sum_{i=0}^{\log_{r/h} n - 1} O\left((r \cdot t + r^2 \cdot \xi) \cdot \xi^i\right) + \sum_{i=0}^{\log_{r/h} n - 1} O\left(r \cdot \xi \frac{n}{r^{i+1}} \cdot \xi^i\right) = \quad (1)$$

$$(r \cdot t + r2 \cdot \xi)\xi \log r/hn - 1\xi - 1 +$$

$$O(r \cdot n \cdot 1 - (\xi r)\log r/n + 11 - \xi r = O(r \cdot t + r2 \cdot \xi \xi \log rhn + r \cdot n)$$

For the case d=1, from Lemma 1, $\xi=2$ and h=1. Putting these into the above equation, one obtains:

$$O\left((r \cdot t + r^2) 2^{\log_r n} + r \cdot n\right) = O\left((r \cdot t + r^2) n^{\log_r 2} + r \cdot n\right) = O(n + t \cdot n^\epsilon)$$

For the case d>2 and Theorem 1, $\xi = O(r^{1-1/d})$ and h=O(1). Putting these into Lemma 1 one obtains:

$$O\left((r \cdot t + r^2 \cdot r^{1-1/(2d-4)})\right)$$

$$\left(r^{1-1/d}\right)^{\log_{r/h} n} + r \cdot n = O\left((r \cdot t + r^{3-\frac{1}{d}})\left(\left(r^{1-\frac{1}{d}}\right)^{\log_r n \log \frac{r}{2}} + r \cdot n\right)\right) =$$

$$O\left((r \cdot t + r^{3-1d \cdot n1 - 1d1 + \log rhn + r \cdot n}\right) = O(n + 1 \cdot n1 - 1d - \epsilon)$$

Putting these together, the circuit size is $$O\left(n + t \cdot n^{1-\frac{1}{d}-\epsilon}\right).$$

The circuit depth may be proven by induction on the height of T. For a tree T of height 1 the root has r leaf children. The circuit starts with r instances of IsContaining and r instances of IsCrossing in parallel, whose depth is $\ell$. Then the circuit has a subcircuit for the algorithm BuildCopyAndRecurseMatrix whose depth is $O(\xi \log r)$. Then, the circuit has an instance of matrix multiplication whose depth is constant. The total depth $\ell + O(\xi \cdot \log r)$.

Assuming the circuit depth of a tree of height (d−1) is $(d-1)\ell + (d-1)O(\xi \cdot \log r)$ we prove for a tree of height d. For a tree of height d>1 the circuit has r instances of IsContaining and r instances of IsCrossing in parallel. Then, the algorithm has a BuildCopyAndRecurseMatrix subcircuit followed by $\xi$ subcircuits that compute range search queries on subtrees of height (d−1). This yields a circuit depth of $d \cdot \ell + dO(\cdot \xi \log r) = O(\ell \cdot \log n)$.

Thus, with the copy-and-recurse based PPRangeSearch algorithm, e.g., Algorithm 3 in FIG. 7, which utilizes the copy-and-recurse matrix generated by the generator 248, such as by executing the BuildCopyAndRecurseMatrix algorithm (Algorithm 4 in FIG. 8), for example, a partition tree can be efficiently used under FHE to perform range searches, which are the basis for a number of computing operations, such as encrypted database search operations, which can be defined as range queries or searches. As described above, to process a range search query, an arithmetic circuit (or model) whose size is $O(n+tn^{1-1/d+\xi})$ and depth is $O(\log n)$, where n is the number of points, d is their dimensionality and t is the time to check how a range interacts with basic objects (a point or a simplex).

Since, more complex ranges mean a higher t value, and since in practice comparing a range to such objects is the dominant part of the running time, in order to achieve a more efficient operation, it is important to reduce this number of compares. The illustrative embodiments provide an improvement, over the naive implementation of checking every point, of $O(n \cdot t)$, where again $O(n)$ is a lower bound when running under FHE, and $O(t \cdot n^{1-1/d+\xi})$ is the best bound known in plaintext when allowing near linear storage.

The efficiency in the performance achieved by the illustrative embodiments comes, at least in part, from the way the partition tree is traversed, which takes advantage of the properties of partition trees with regard to each node being bound to only ξ number of children that need to be recursed into. These properties are used to recurse into ξ children, thus achieving similar results (ignoring the O(n) overhead to allow this recursion) as the plaintext algorithm.

The copy-and-recurse based PPRangeSearch algorithm may be implemented by a FHE enabled search engine to perform various types of FHE operations involving range searches. Each of these operations may have the functions $f$ and $g$, discussed above, set such that the corresponding operation is performed using the mechanisms of the illustrative embodiments. Examples of these operations include counting, reporting, minimum, averages and k-means clustering, and the like. The following will describe these example operations, where in each of these examples, again P is a set of points and Γ is a family of ranges with γ∈Γ, and all are in $\mathbb{R}^d$, for some d≥1.

For example, with regard to the counting operation, this operation may be characterized as the problem of computing |P∩γ|, i.e. how many points of P are in γ. For this, the operation sets $f: 2^P \rightarrow \mathbb{N}$ which is defined as $f(A)=|A|$, and sets $g: \mathbb{N} \times \mathbb{N} \rightarrow \mathbb{N}$, which is defined as $g(a,b)=a+b$.

As another example, with regard to the reporting operation, this operation may be characterized as the problem of outputting the points in |P∩γ|. Here the points are not reported explicitly, as that would violate the privacy requirements of FHE, but instead what is reported is O(log n) canonical subsets $S_{v1}, \ldots, S_{vm}$ such that $\cap_i S_{vi}=P\cap\gamma$. The canonical subsets are the sets associated with nodes in the partition tree. To report them, the operation assigns an identifier to each node and outputs the identifier of the node. For this, the operation sets $f: 2^P \rightarrow 2^N$, that is, $f$ maps a set A⊂P into the set of identifiers of canonical subsets whose union is A. In this case, $f$ is defined as $f(S_v)=ID(S_v)$, where ID(·) is a function returning a unique identifier for each subset $S_v$ associated with a node. Similarly, g is set to be g: $2^N \times 2^N \rightarrow 2^N$ and is defined as $g(A,B)=A\cup B$.

In another example, with regard to the minimum, or "Min", operation, this operation may be characterized as reporting $\min_{p\in P\cap\gamma}(\text{cost}(p))$, where cost: P→R is some cost function. To report the minimum, the operation sets $f: 2^P \rightarrow R$, defines $f(A)=\min_{p\in PA}(\text{cost}(p))$, and defines $g(a,b)=\min(a,b)$. It should be noted that min under FHE is costly to compute, however using the partition tree implementation of PPRangeSearch of the illustrative embodiments yields only O(log n) calls to min, as oppose to O(n) calls using the naive approach of checking every point in P.

In still another example, with regard to averages, the average of a set A is $$\text{Avg}(A) = \frac{\Sigma_{p\in A} p}{|A|}.$$

Since division is costly under FHE, to compute an average, the operation sets $f: 2^P \rightarrow P\times R$ and defines $f(A)=(\text{Sum}_A, \text{Size}_A)$, where $\text{Sum}_A=\Sigma_A a$ and $\text{Size}_A|A|$. The average can be computed $\text{Avg}(A)=\text{Sum}_A/\text{Size}_A$.

With regard to k-means clustering as another example, for a fixed k, a k-means clustering can be computed by randomly picking k "center" points $c_1, \ldots, c_k$ and then repeating the following operations:

For each center, find the points closest to it (denoted as its neighborhood), $$\text{Neighborhood}(c_i) = \{p \in P | (\text{dist}(p, c_i) < \text{dist}(p, c_j) \text{ for any } j \neq i\}$$

Replace each center with the average of its neighborhood, $$c_i := \text{Avg}(\text{Neighborhood}(c_i)).$$

These 2 operations can be implemented using a range searching query that can be processed under FHE using the partition tree based PPRangeSearch mechanisms of the illustrative embodiments. That is, for each $c_i$, the operation defines the following semi-algebraic range:

$$\gamma_{c_i} = \{p \in \mathbb{R}^d | (\text{dist}(p, c_i) < \text{dist}(p, c_j) \text{ for every } j \neq i)\}$$

whose geometric shape is a polytope with k−1 faces. Then, the new center is set to be $c_i:=\text{Avg}(P\cap\gamma_{ci})$.

These are only examples of computer operations that may be performed using FHE and the partition tree based range search mechanisms of the illustrative embodiments. Other computer operations that may be represented as range searches may also make use of the improved computing tool and improved computing tool functionality/operations of the illustrative embodiments without departing from the spirit and scope of the present invention.

Thus, the illustrative embodiments provide an improved computing tool and improved computing tool functionality/ operations that operate to efficiently perform fully homomorphic encryption (FHE) based operations using partition trees and range searching mechanisms to avoid having to evaluate all data points or records of a database and instead focus on specific ranges, or portions of the partition tree, that are completely within a given range or intersect a given range of the FHE based operation. This makes the operation more efficient in that less data points or records need to be evaluated.

Figure 9:
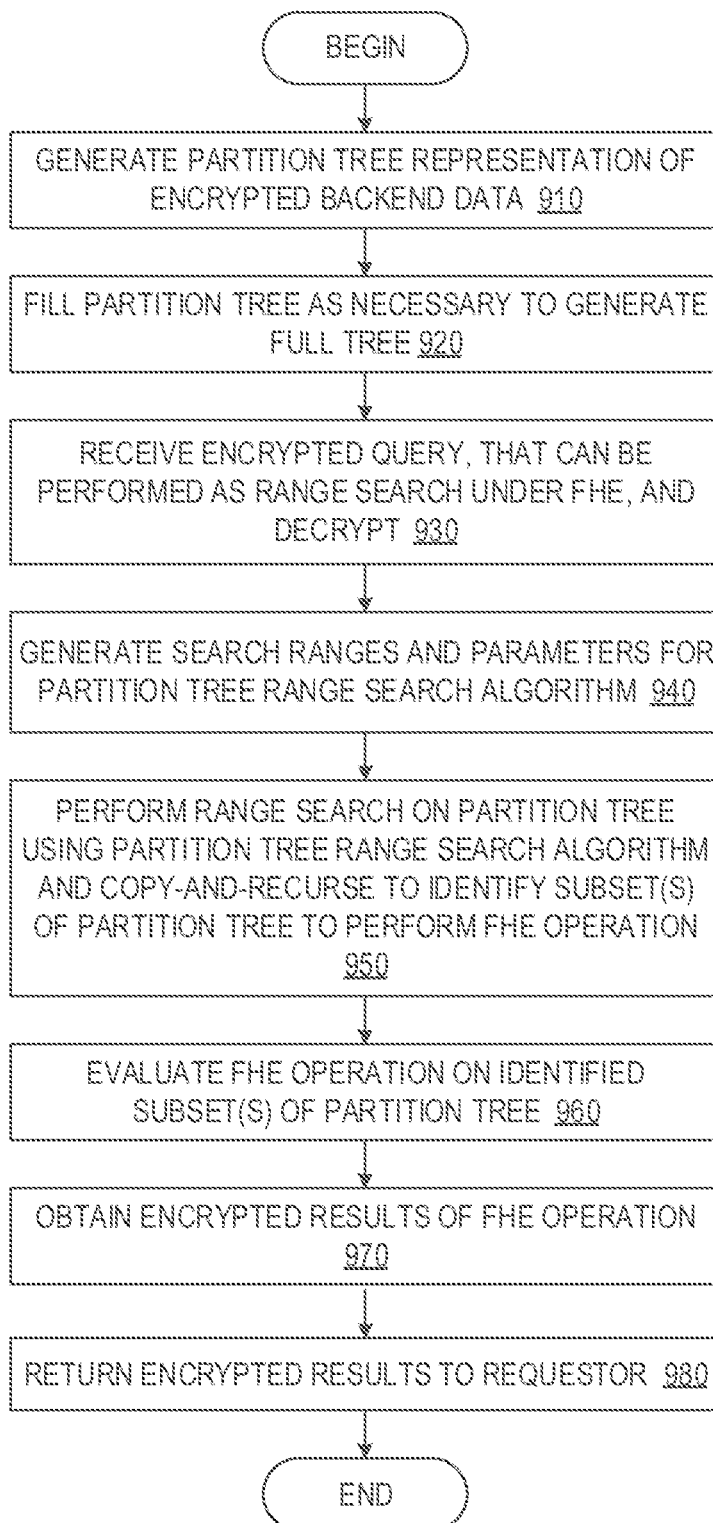
FIG. 9 is a flowchart outlining an example operation for performing fully homomorphic encryption based operations using partition tree range searches and a copy-and-recurse functionality in accordance with one illustrative embodiment.

The illustrative embodiments described above implement partition tree generation logic, partition tree range search logic, copy-and-recurse logic, compact logic, and the like, to provide an improved computer functionality for performing FHE operations. FIG. 9 is a flowchart outlining an example operation involving such logic for performing FHE operations. FIG. 9 present a flowchart outlining an example operation of the components of the present invention with regard to one or more illustrative embodiments. It should be appreciated that the operations outlined in FIG. 9 is specifically performed automatically by an improved computer tool of the illustrative embodiments, and is not intended to be, and cannot practically be, performed by human beings either as mental processes or by organizing human activity. To the contrary, while human beings may, in some cases, initiate the performance of the operations set forth in FIG. 9, and may, in some cases, make use of the results generated as a consequence of the operations set forth in FIG. 9, the operations in FIG. 9 themselves are specifically performed by the improved computing tool in an automated manner.

As shown in FIG. 9, the operation starts by generating one or more partition tree data structures for a data set, e.g., data stored in a database or backend data store, such as 250 in FIG. 2, for example (step 910). It should be appreciated, in cases where the data owner is a separate entity from the cloud service provide, the data owner may implement this operation and provide one or more encrypted partition tree data structures to the cloud service provider; otherwise the cloud service provider may operate as both data owner and cloud, and implement a partition tree generator, such as 242 in FIG. 2, to provide the one or more partition trees. The operation for generating the partition trees may involve the operations described above with regard to FIGS. 4-6, for example, including performing the FillTree operation to generate a full partition tree for FHE purposes (step 920).

An encrypted query may then be received from a client computing device, e.g., an application executing on a separate computing device, such as clients 210, 212 (step 930). It is assumed for this description that the encrypted query is one that can be represented as a range search under FHE. The encrypted query is encrypted with the public key of the client and can then be decrypted by the cloud service provider to identify the operation being requested.

The decrypted query is used to generate the ranges and parameters for performing a partition tree range search, such as identifying the input parameters to the partition tree range search algorithm, e.g., PPRangeSearch of FIG. 7 (step 940). The partition range search algorithm is then executed on the partition tree using the copy-and-recurse operations to identify the subsets of the partition tree to perform FHE operations (step 950). FHE operations are then evaluated on these subsets of the partition tree (step 960) and the encrypted results of the FHE operations are obtained (step 970). The encrypted results of the FHE operations are then returned to the original requestor, i.e., the client computing device that submitted the query (step 980) and the operation terminates.

Again, it should be noted that while the illustrative embodiments are described with reference to partition trees and range search operations, the illustrative embodiments are not limited to partition trees and range searches. To the contrary, the copy-and-recurse operations and computing tool may operate on other types of tree data structures and perform other operations as noted above, that are not limited to range searches. For example, the illustrative embodiments may operate on decision tree or search tree data structures. In a decision tree there is a bound $\xi=1$ on the number of children that need to be recursed into. This leads to a circuit of size $O(n+t \cdot n^e)$, where t is the size of the circuit that evaluates the condition at a node. In r-ary search trees (for example B-trees) there is a bound $\xi=1$ on the number of children (with r depending on the parameter of the B-tree). This leads to a circuit of size $O(n+t \cdot n^e)$, where t is the size of the circuit that evaluates the comparison.

As is apparent from the detailed description above, the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a FHE enabled search engine that implements logic for efficiently performing range searches of partition trees using a copy-and-recurse functionality that efficiently identifies portions of a data set to which to apply FHE operations, then perform those FHE operations on the identified portions, and return encrypted results. The improved computing tool implements mechanism and functionality, such as the FHE enabled search engine 240 of cloud computing service 230 in FIG. 2, which cannot be practically performed by human beings either outside of, or with the assistance of, a technical environment, such as a mental process or the like. The improved computing tool provides a practical application of the methodology at least in that the improved computing tool is able to efficiently perform FHE operations on data sets targeting specific subsets of the datasets rather than having to evaluate every data point or record in a database.

Figure 10:
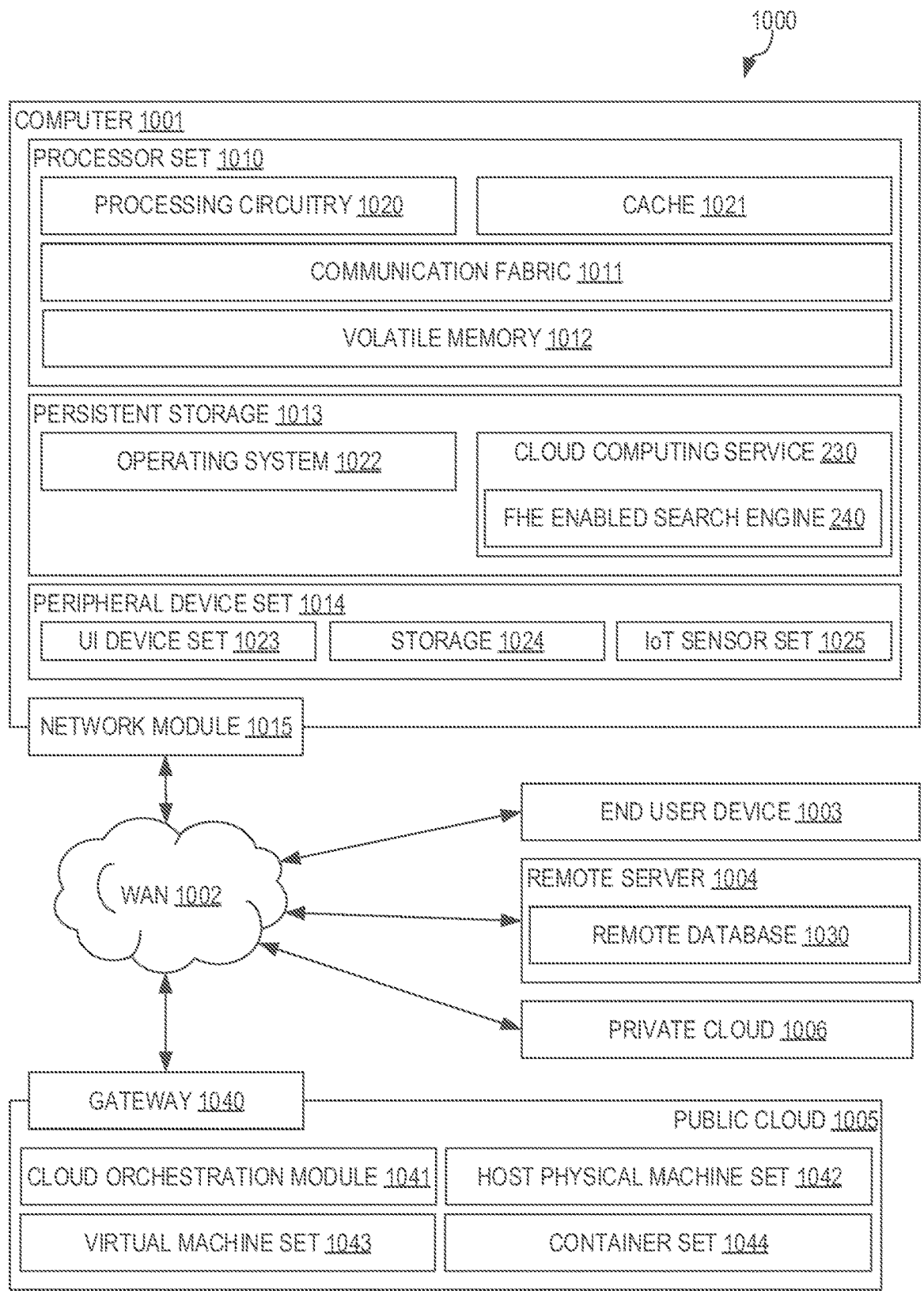
FIG. 10 is an example diagram of a distributed data processing system environment in which aspects of the illustrative embodiments may be implemented and at least some of the computer code involved in performing the inventive methods may be executed.

FIG. 10 is an example diagram of a distributed data processing system environment in which aspects of the illustrative embodiments may be implemented and at least some of the computer code involved in performing the inventive methods may be executed. That is, computing environment 1000 contains an example of an environment for the execution of at least some of the computer code involved in performing the inventive methods, such as the cloud computing service 230 having FHE enabled search engine 240. In addition to blocks 230 and 240, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 230, as identified above), peripheral device set 1014 (including user interface (UT) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

Computer 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

Processor set 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 200 in persistent storage 1013.

Communication fabric 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

Persistent storage 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 230 typically includes at least some of the computer code involved in performing the inventive methods.

Peripheral device set 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

Network module 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

Remote server 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

Public cloud 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

As shown in FIG. 10, one or more of the computing devices, e.g., computer 1001 or remote server 1004, may be specifically configured to implement a the cloud computing service 230 and the FHE enabled search engine 240. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 1001 or remote server 1004, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result as previously noted above.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   generating, for a data set in a backend data store, a tree data structure comprising a hierarchy of nodes and edges connecting the nodes in a parent-child relationship;
   in response to receiving an encrypted query from a client computing device, executing a search operation using the tree data structure at least by executing a copy-and-recurse computing tool to identify a portion of the tree data structure to which to apply a fully homomorphic encryption (FHE) operation, wherein the copy-and-recurse computing tool copies a subset of nodes of the tree data structure and recurses the search operation into the copied subset of nodes;
   executing the FHE operation on a portion of the data set, corresponding to the identified portion of the tree data structure, to generate results of the FHE operation; and outputting the results as an encrypted output to the client computing device, wherein the subset of nodes of the tree data structure are child nodes that cross a specified range of the search operation, and wherein the copy-and-recurse computing tool copies the subset of nodes of the tree data structure and recurses the search operation into the copied subset of nodes at least by generating a copy-and-recurse matrix and multiplying a vector representing the child nodes of the tree data structure, that cross the specified range of the search operation, by the copy-and-recurse matrix.

2. The method of claim 1, wherein the copy-and-recurse computing tool, during traversal of the tree data structure, for a given node in the tree data structure, copies a predetermined number of child nodes and their subtrees to a buffer, and recurses the range search operation only into the copied child nodes.

3. The method of claim 2, wherein the predetermined number of child nodes is a bound value limiting a number of nodes recursed into to be less than a total number of child nodes of the given node.

4. The method of claim 1, wherein generating the tree data structure further comprises:

executing a fill-tree operation on an initial tree data structure, wherein the fill-tree operation comprises:

identifying a first set of nodes having less than a predetermined number of child nodes;

identifying a second set of nodes that are leaf nodes whose distance from a root node of the tree data structure are less than a predetermined distance;

for the first set of nodes, adding an empty child node to an inner node that has less than the predetermined number of child nodes; and for the second set of nodes, adding the predetermined number of child nodes to the second node.

5. The method of claim 1, wherein the tree data structure is one of a partition tree data structure, a decision tree data structure, or a search tree data structure.

6. The method of claim 1, wherein the search operation is a range search operation, and wherein executing the search operation comprises executing a first algorithm that identifies a first subset of nodes in the tree data structure that are contained in a range of the range search operation, and a second algorithm that identifies a second subset of nodes in the tree data structure that are not contained in the range, but that cross the range, and wherein the copy-and-recurse computing tool executes on the second subset of nodes.

7. The method of claim 1, wherein the computer-implemented method is performed as part of a cloud computing service, and wherein the encrypted query is part of a request for performance of the cloud computing service.

8. The method of claim 7, wherein the encrypted query comprises a query that is represented as a range search operation that is one of a counting operation, a reporting operation, an averaging operation, or a k-means clustering operation.

9. The method of claim 7, wherein the cloud computing service is a location service for locating a physical location of one or more entities.

10. A computer program product comprising a computer readable storage medium having a computer readable program stored therein, wherein the computer readable program, when executed on a computing device, causes the computing device to:

generate, for a data set in a backend data store, a tree data structure comprising a hierarchy of nodes and edges connecting the nodes in a parent-child relationship;

in response to receiving an encrypted query from a client computing device, execute a search operation using the tree data structure at least by executing a copy-and-recurse computing tool to identify a portion of the tree data structure to which to apply a fully homomorphic encryption (FHE) operation, wherein the copy-and-recurse computing tool copies a subset of nodes of the tree data structure and recurses the search operation into the copied subset of nodes;

execute the FHE operation on a portion of the data set, corresponding to the identified portion of the tree data structure, to generate results of the FHE operation; and output the results as an encrypted output to the client computing device, wherein the subset of nodes of the tree data structure are child nodes that cross a specified range of the search operation, and wherein the copy-and-recurse computing tool copies the subset of nodes of the tree data structure and recurses the search operation into the copied subset of nodes at least by generating a copy-and-recurse matrix and multiplying a vector representing the child nodes of the tree data structure, that cross the specified range of the search operation, by the copy-and-recurse matrix.

11. The computer program product of claim 10, wherein the copy-and-recurse computing tool, during traversal of the tree data structure, for a given node in the tree data structure, copies a predetermined number of child nodes and their subtrees to a buffer, and recurses the range search operation only into the copied child nodes.

12. The computer program product of claim 11, wherein the predetermined number of child nodes is a bound value limiting a number of nodes recursed into to be less than a total number of child nodes of the given node.

13. The computer program product of claim 10, wherein generating the tree data structure further comprises:

executing a fill-tree operation on an initial tree data structure, wherein the fill-tree operation comprises:

identifying a first set of nodes having less than a predetermined number of child nodes;

identifying a second set of nodes that are leaf nodes whose distance from a root node of the tree data structure are less than a predetermined distance;

for the first set of nodes, adding an empty child node to an inner node that has less than the predetermined number of child nodes; and for the second set of nodes, adding the predetermined number of child nodes to the second node.

14. The computer program product of claim 10, wherein the tree data structure is one of a partition tree data structure, a decision tree data structure, or a search tree data structure.

15. The computer program product of claim 10, wherein the search operation is a range search operation, and wherein executing the search operation comprises executing a first algorithm that identifies a first subset of nodes in the tree data structure that are contained in a range of the range search operation, and a second algorithm that identifies a second subset of nodes in the tree data structure that are not contained in the range, but that cross the range, and wherein the copy-and-recurse computing tool executes on the second subset of nodes.

16. The computer program product of claim 10, wherein the computer-implemented method is performed as part of a cloud computing service, and wherein the encrypted query is part of a request for performance of the cloud computing service.

17. The computer program product of claim 16, wherein the encrypted query comprises a query that is represented as a range search operation that is one of a counting operation, a reporting operation, an averaging operation, or a k-means clustering operation.

18. An apparatus comprising:
at least one processor; and
at least one memory coupled to the at least one processor, wherein the at least one memory comprises instructions which, when executed by the at least one processor, cause the at least one processor to:
generate, for a data set in a backend data store, a tree data structure comprising a hierarchy of nodes and edges connecting the nodes in a parent-child relationship;
in response to receiving an encrypted query from a client computing device, execute a search operation using the tree data structure at least by executing a copy-and-recurse computing tool to identify a portion of the tree data structure to which to apply a fully homomorphic encryption (FHE) operation, wherein the copy-and-recurse computing tool copies a subset of nodes of the tree data structure and recurses the search operation into the copied subset of nodes;
execute the FHE operation on a portion of the data set, corresponding to the identified portion of the tree data structure, to generate results of the FHE operation; and
output the results as an encrypted output to the client computing device,
wherein the subset of nodes of the tree data structure are child nodes that cross a specified range of the search operation, and wherein the copy-and-recurse computing tool copies the subset of nodes of the tree data structure and recurses the search operation into the copied subset of nodes at least by generating a copy-and-recurse matrix and multiplying a vector representing the child nodes of the tree data structure, that cross the specified range of the search operation, by the copy-and-recurse matrix.

* * * * *